United States Patent
Thubert et al.

(10) Patent No.: US 9,699,075 B2
(45) Date of Patent: *Jul. 4, 2017

(54) REPAIR OF FAILED NETWORK ROUTING ARCS USING DATA PLANE PROTOCOL

(71) Applicant: Cisco Technology, Inc., San Jose, CA (US)

(72) Inventors: Pascal Thubert, La Colle sur Loup (FR); Patrice Bellagamba, Saint-Raphael (FR); Dirk Anteunis, Fayence (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,000

(22) Filed: Oct. 3, 2016

(65) Prior Publication Data

US 2017/0026279 A1    Jan. 26, 2017

Related U.S. Application Data

(63) Continuation of application No. 14/155,562, filed on Jan. 15, 2014, now Pat. No. 9,485,136.

(Continued)

(51) Int. Cl.
*H04L 12/703* (2013.01)
*H04L 12/24* (2006.01)
(Continued)

(52) U.S. Cl.
CPC .......... *H04L 45/28* (2013.01); *H04L 41/0668* (2013.01); *H04L 45/18* (2013.01); *H04L 45/48* (2013.01); *H04L 49/557* (2013.01)

(58) Field of Classification Search
CPC .......... H04L 45/18; H04L 45/02; H04L 45/22; H04L 45/28; H04L 41/0803; H04L 45/12;
(Continued)

(56) References Cited

U.S. PATENT DOCUMENTS

| | | | |
|---|---|---|---|
| 7,969,862 B1* | 6/2011 | Wang | H04L 45/125 370/216 |
| 2009/0073921 A1* | 3/2009 | Ji | H04L 45/00 370/328 |

(Continued)

OTHER PUBLICATIONS

International Search Report and Written Opinion in counterpart International Application No. PCT/US2014/068316, mailed Feb. 20, 2015, 13 pages.

(Continued)

*Primary Examiner* — Awet Haile
(74) *Attorney, Agent, or Firm* — Edell, Shapiro & Finnan, LLC

(57) ABSTRACT

A network includes routing arcs for routing network traffic to a destination. Each arc comprising nodes connected in sequence by reversible links oriented to direct network traffic to first and second edge nodes through which the network traffic exits the arc. The nodes in the arc detect a first failure. In response, the nodes exchange first management frames to reverse links in the arc so that the network traffic in the arc is directed away from the first failure toward the first edge node of the arc through which the network traffic exits the arc. The nodes detect a second failure in the arc that is spaced apart from the first failure. In response, the nodes exchange second management frames to freeze incoming edges of parent arcs to prevent network traffic in the corresponding parent arc from entering the arc.

17 Claims, 33 Drawing Sheets

Related U.S. Application Data

(60) Provisional application No. 61/913,555, filed on Dec. 9, 2013.

(51) Int. Cl.
*H04L 12/705* (2013.01)
*H04L 12/939* (2013.01)
*H04L 12/753* (2013.01)

(58) Field of Classification Search
CPC ..... H04L 45/128; H04L 45/24; H04L 47/125; H04L 45/48; H04L 45/64; H04W 84/18
See application file for complete search history.

(56) References Cited

U.S. PATENT DOCUMENTS

| | | | | |
|---|---|---|---|---|
| 2009/0190494 | A1* | 7/2009 | De Giovanni | H04L 45/02 370/254 |
| 2009/0228575 | A1* | 9/2009 | Thubert | H04L 45/128 709/220 |
| 2011/0211579 | A1* | 9/2011 | Cao | H04L 45/02 370/392 |
| 2012/0082073 | A1* | 4/2012 | Andreasen | H04L 12/4633 370/310 |
| 2012/0300668 | A1* | 11/2012 | Thubert | H04L 45/14 370/254 |
| 2013/0208594 | A1 | 8/2013 | Thubert et al. | |
| 2013/0301470 | A1 | 11/2013 | Thubert et al. | |
| 2014/0029416 | A1* | 1/2014 | Ceccarellli | H04L 45/22 370/225 |
| 2014/0098711 | A1* | 4/2014 | Thubert | H04L 45/128 370/255 |
| 2015/0092785 | A1* | 4/2015 | Torvi | H04L 45/04 370/401 |
| 2015/0103691 | A1* | 4/2015 | Bhattacharya | H04L 45/50 370/254 |
| 2015/0163091 | A1 | 6/2015 | Thubert et al. | |

OTHER PUBLICATIONS

Thubert et al., "Available Routing Constructs- draft-thubert-rtgwg-arc-00", Internet Engineering Task Force, Internet Draft, Standards Track, Oct. 2, 2012, 19 pages.

* cited by examiner

REPAIR OF FAILED NETWORK ROUTING ARCS USING DATA PLANE PROTOCOL

CROSS REFERENCE TO RELATED APPLICATIONS

This application is a continuation of U.S. non-provisional application Ser. No. 14/155,562, filed Jan. 15, 2014, which claims the benefit of U.S. provisional application No. 61/913,555, filed Dec. 9, 2013, incorporated herein by reference in their entireties.

TECHNICAL FIELD

The present disclosure relates generally to detecting failed links in a network and, in response, rerouting network traffic using a data plane protocol.

BACKGROUND

A data network routes network traffic in the form of data packets to and from destination devices. The data network typically includes many network devices or nodes connected to each over network links. A network controller controls the nodes over a control plane using control plane Operations, Administration, and Maintenance (OAM) messages in order to reconfigure the network links in the event of link failures/breakages. If connectivity with the network controller is lost, the capability to respond to such link failures is also lost. Even if connectivity is not lost, control plane OAM messages used to reconfigure the nodes and network links often take an inordinate amount of time to travel between the network controller and any target node because the target node may be located deep inside a topology of the data network. This causes unacceptably long reconfiguration delays in the event of link failures.

DESCRIPTION OF EXAMPLE EMBODIMENTS

Overview

Techniques are provided herein to reroute network traffic in a network responsive to one or more failures in the network using a data plane protocol. The network includes multiple routing arcs for loop-free routing of network traffic to a destination. Each routing arc comprising nodes connected in sequence by reversible links oriented to direct network traffic in the routing arc to first and second edge nodes and their corresponding edges at opposite ends of the routing arc and through which the network traffic exits the routing arc. The routing arc includes incoming nodes each connected with a corresponding incoming edge of a corresponding parent routing arc that directs network traffic in that parent routing arc toward the corresponding incoming node. Each node includes a network device. A first failure in the routing arc proximate a first node in the routing arc is detected. Responsive to the detecting the first failure, first management frames are exchanged between nodes within the routing arc in order to reverse links in the routing arc as appropriate so that the network traffic in the routing arc is directed away from the first failure toward the first edge node of the routing arc through which the network traffic is able to exit the routing arc. A second failure is detected in the routing arc proximate a second node in the routing arc that is spaced apart from the first failure proximate the first node. Responsive to the detecting the second failure, second management frames are exchanged between nodes in the routing arc to freeze each incoming edge to prevent network traffic in the corresponding parent routing arc from entering the routing arc.

Example Embodiments

Figure 1:
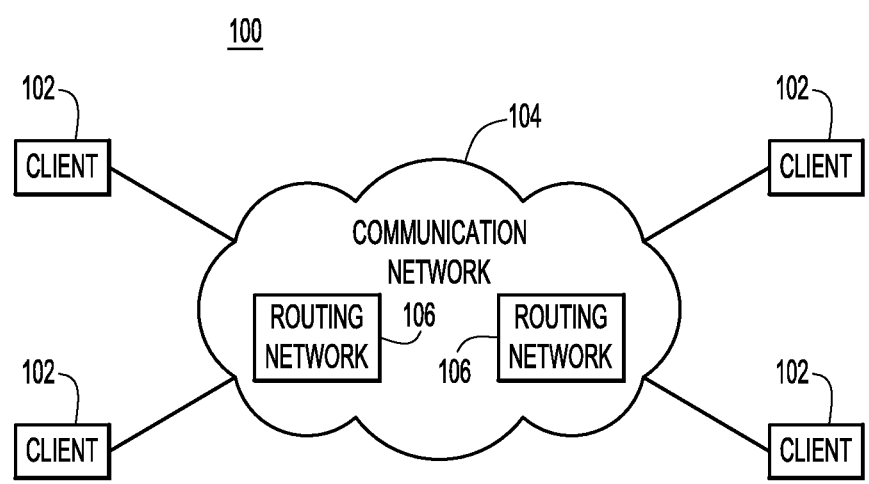
FIG. 1 is a block diagram of an example network environment in which techniques provided herein may be implemented.

Referring first to FIG. 1, there is a shown a block diagram of an example network environment 100 in which techniques presented herein may be performed. Environment 100 includes multiple destination devices 102, e.g., client computers, configured to communicate with each over a communication network 104, which may include wide area networks (WANs), e.g., the Internet, and local area networks (LANs). Communication network 104 includes one or more routing networks 106 to route network traffic in the form of data packets within communication network 104 to and from destination devices 102. Routing networks 106 each include communication links, such as wireless, wired, and/or optical cable links, over which the network traffic is routed. Each of routing networks 106 may be configured in accordance with any number of different network topologies to achieve efficient routing of the network traffic therein in normal operation and fast rerouting of the network traffic when failures occur in the routing network, as described below.

Arc Topology

Figure 2:
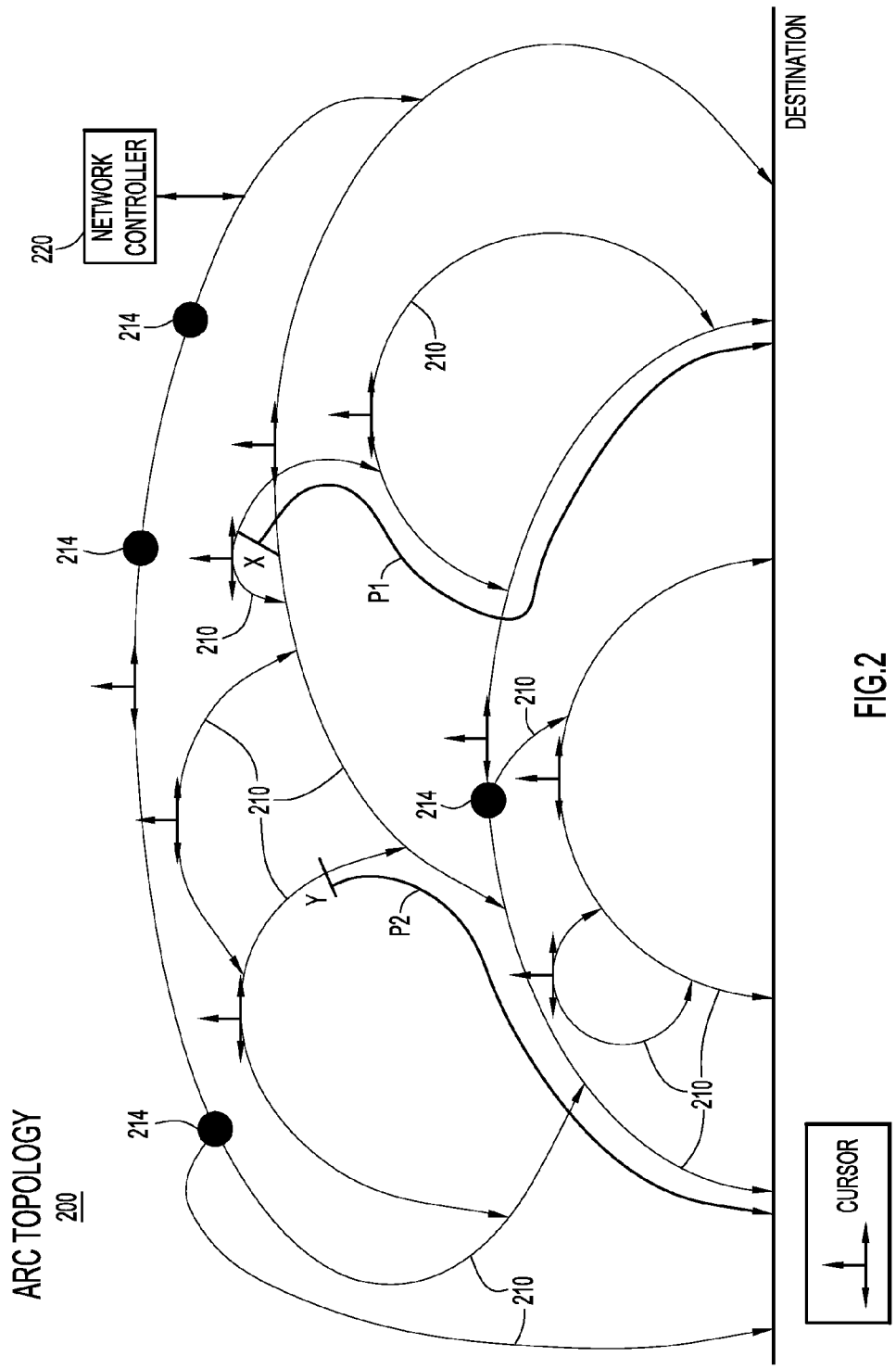
FIG. 2 illustrates an example loop-free arc topology for a computer network of FIG. 1.

With reference to FIG. 2, there is depicted an example loop-free arc topology 200 for one of routing networks 106. Arc topology 200 may be configured as a directed acyclic graph (DAG). Arc topology 200 includes a plurality of routing arcs 210 for reaching a destination (depicted as a horizontal line at the bottom of FIG. 2), such as one of destination devices 102. Each routing arc 210 comprises a plurality of network devices 214 (only a few of which are depicted in FIG. 2 for simplicity) each having at least two data links for reaching adjacent network devices on left and right sides of the given network device. A network controller 220 may initially establish the particular topology of arc topology 200 and provide high-level control of the arc topology once established using control plane Operations, Administration, and Maintenance (OAM) messages. OAM messages are also referred to herein as "OAM frames" and "management frames."

Once established, arc topology 200 guarantees that any network device 214 at any location on any routing arc 210 has at least two non-congruent paths for reaching the destination, guaranteeing reachability to the destination even if a link failure is encountered in the arc topology. In the ensuing description, a network device (e.g., network device 214) is also referred to herein as a "network node" or simply a "node" that is assigned an identifiable position within arc topology 200. Thus, arc topology 200 is also referred to more broadly as a network of network devices or nodes.

Nodes 214 receive and forward network traffic (e.g., data packets) via their data links in their respective arcs. Because nodes "forward" network traffic to each other toward the destination, they are said to operate in a "forwarding plane" of arc topology 200. The "forwarding plane" and the "data plane" are synonymous and may be used interchangeably. Each routing arc 210 also includes a cursor (labeled "CURSOR" in FIG. 2 and depicted as an upside-down T) to control a direction of network traffic flow in the routing arc. A node holding the cursor always directs network traffic away from itself toward either of the opposite ends of the routing arc from which the network traffic exits the routing arc. Thus, in normal operation, network traffic flows away from the cursor in each of the routing arcs and cascades downward from routing arc to routing arc along a shortest network path to the destination. In an example, network traffic at location X flows along path P1 to the destination, while network traffic at location Y flows along path P2 to the destination.

Arc Configuration

Figure 3:
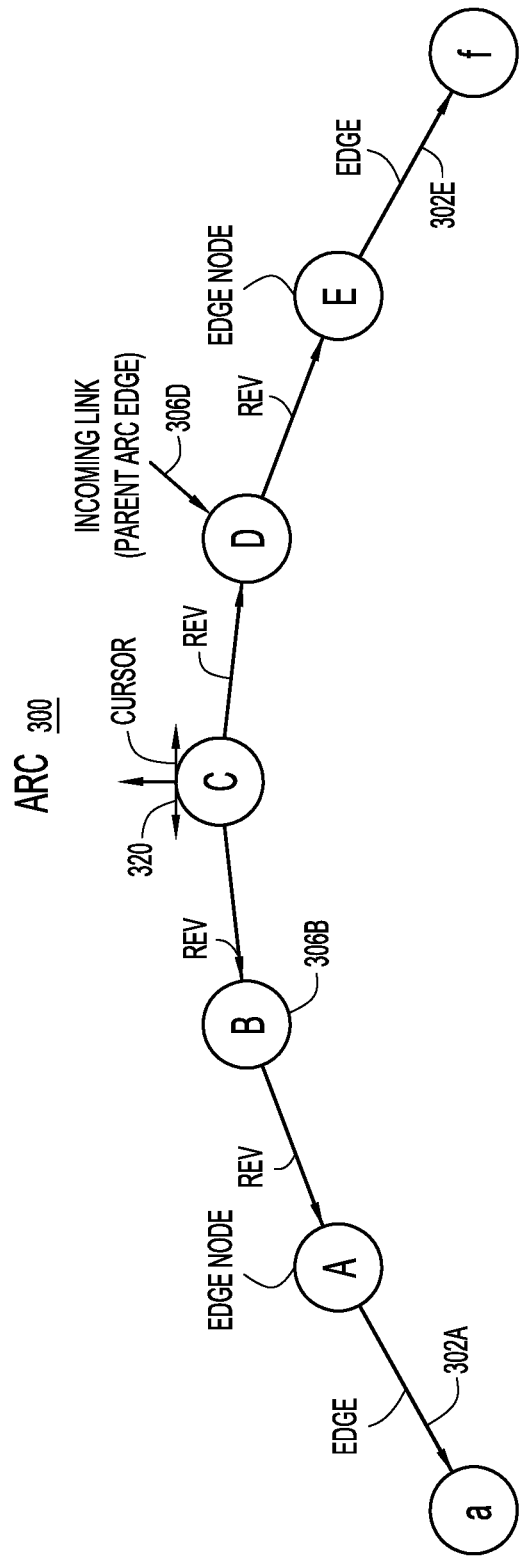
FIG. 3 illustrates an example routing arc in the arc topology of FIG. 2.

With reference to FIG. 3, there is a depicted an example routing arc 300 representative of any of routing arcs 210 in arc topology 200. At a high-level, routing arc 300 is a double ended reversible path/arc for forwarding network traffic. A reversible routing arc includes one or more reversible links, and the reversible routing arc may include one or more non-reversible links at each end of the routing arc. In other embodiments, the links at the end may also be reversible. Also, the routing arc includes a cursor to control a direction of network traffic flow in the routing arc. A node holding the cursor always directs traffic away from itself toward either of the two opposite ends for the routing arc from which the network traffic exits the routing arc, perhaps to enter into another routing arc. A routing arc may comprise only one node, or multiple nodes, such as two nodes, three nodes, or more than three nodes.

In the example of FIG. 3, routing arc 300 includes multiple successive nodes, including edge nodes A and E at opposite ends of the arc that terminate the arc, and intermediate nodes B, C, and D between the edge nodes. Reversible links (labeled "Rev" in FIG. 3) connect successive nodes A-E, i.e., node A is connected on its right to next node B via a first reversible link, node B is connected on its right to next node C via a second reversible link, and so on down the line. Nodes A-E are considered "safe" because each is connected with a reversible link denoted "Rev" in the figure. Reversible links Rev are said to be reversible because the nodes connected to the links are able to reverse the direction, either left or right, in which network traffic travels over the link. Edge nodes A and E are respectively connected to outgoing (i.e., outwardly directed) edges 302E and 302A (also referred to as edge links 302E and 302A).

Network traffic in routing arc 300 may exit the right end of the routing arc through edge node E and respective edge 302E or the left end of the arc through edge node A and respective edge 302A. One end of edge 302E is connected to edge node E, while the other end of edge 302E is connected to a node "a" that is normally a part of another arc in topology 200, such that edge 302E is said to be "incoming" to that other routing arc, and arc 300 is said to be a parent arc to the other routing arc. Similarly, one end of edge 302A is connected to edge node A, while the other end of edge 302A is connected to a node "f" that is normally a part of another routing arc in topology 200, such that edge 302A is said to be "incoming" to that other routing arc.

Safe nodes B and D respectively receive edge links 306B and 306D from parent routing arcs (not shown in FIG. 3). Relative to arc 300, edge links 306B and 306D represent incoming links through which network traffic from the parent routing arcs may enter into routing arc 300. The term "routing arc" is also referred to simply as an "arc."

Arc 300 also includes a moveable or transferrable cursor 320 that is held by node C referred to as a cursor node and that provides exclusive control of directing the network traffic along the arc. One node of arc 300 has possession of arc cursor 320 at any given time. The node having possession of the arc cursor 320, e.g., node C, can control the network traffic along the arc based on possession of the arc cursor. In particular, the node holding the cursor directs network traffic away from itself along either of its outwardly-oriented (i.e., left pointing and right pointing) links toward the opposite ends of the arc (i.e., toward edge nodes A and E and respective edges 302A and 302E). In the example of FIG. 3, all network traffic is directed away from node C because node C holds the cursor. This means that network traffic in arc 300 to the right of node C is directed to edge node E, while network traffic in the arc to the left of node C is directed to edge node A.

Arc Failures

Returning again to FIG. 2, link failures in arc topology 200 and the way in which such failures are handled in the arc topology are now described briefly. A Shared Risk Link Group (SRLG) refers to an arrangement where links in arc topology 200 share a common fiber (or other common physical attribute, such as a copper wire). Thus, the links in the group have a shared risk; if the common fiber fails, multiple links in the group may fail concurrently. For example, an SRLG failure in arc topology 200 may mean concurrent link failures in multiple arcs of the arc topology. When the SRLG failure occurs, it is important that arc topology 200 be able to repair itself quickly and autonomously in order to reroute network traffic in the arc topology away from the failure locations, i.e., away from breakages in the arcs, for continued routing toward the destination. In one approach to repair/reroute in arc topology 200, network controller 220 may exchange control plane OAM messages with targeted nodes 214 in order to reconfigure links of the arc topology to avoid the breakages; however, this is time consuming and inefficient because the control plane OAM frames may wind their way from nodes deep in arc topology 200 close to the breakages all the way to network controller 220 on a periphery of the arc topology.

Accordingly, techniques presented herein perform link repair and reroute operation in arc topology 200 using a strictly data plane protocol that operates within broken/failed arcs and arcs connected thereto, which is simpler and more efficient than use of the control plane protocol. Based on the data plane protocol, nodes within a broken arc exchange management frames in the data plane with each in order to reconfigure links and reroute network traffic in the broken arc to compensate for the breakage and thus provide continued routing of the network traffic to the destination. The use of such data plane management messages to perform repair and reroute operations in arc topology 200 instead of control plane management messages obviates the need for nodes 214 to communicate with network controller 220 in the event of link failures. Thus, the use of the data plane management messages is an efficient, autonomous approach to link repair and reroute operations that avoids the inefficiencies and delays associated with the use of the control plane protocol.

Figure 4:
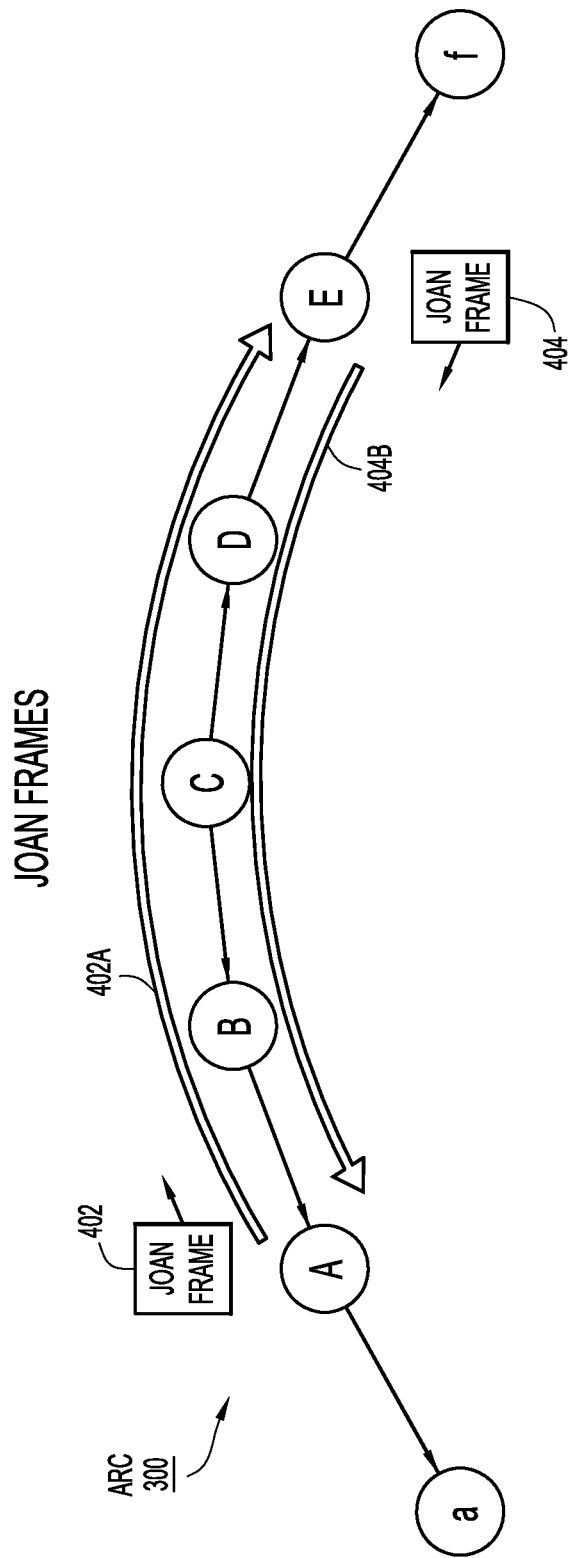
FIG. 4 is an illustration of example data plane management frames exchanged between nodes in a routing arc.

In an embodiment, the data plane management frames exchanged between nodes to detect and repair SRLG failures in arc topology 200 are referred to as Joint Operation and Automation of the Network (JOAN) frames. A JOAN frame is a data plane OAM frame that stays within the arcs 210 of arc topology 200. A JOAN frame may be emitted from any node in a given arc at any time, depending on a triggering event. The JOAN frame is sent from the node that emits the JOAN frame toward one of the edges of the arc, as seen in the example of FIG. 4, discussed below. Through the exchange of JOAN frames, the position of the cursor and directions of links in the arc may be manipulated to reroute network traffic in the arc to avoid the failure in a way that the network traffic can find its way to the destination.

JOAN Frames

With reference to FIG. 4, there is shown an illustration of example data plane management frames, e.g., JOAN frames, 402, 404 in arc 300 that traverse paths 402A, 404B, respectively, between edge nodes A and B in the arc. In the example of FIG. 4, edge node A on the left emits JOAN frame 402 toward edge node E on the right. JOAN frame 402 transits each of nodes B, C, D, and E in succession as it travels to the right from node A toward node E along path 402A. Similarly, edge node E on the right emits JOAN frame 404 toward edge node A on the left. JOAN frame 404 transits each of nodes D, C, B, and A in succession as it travels to the left along path 404A.

Figure 5:
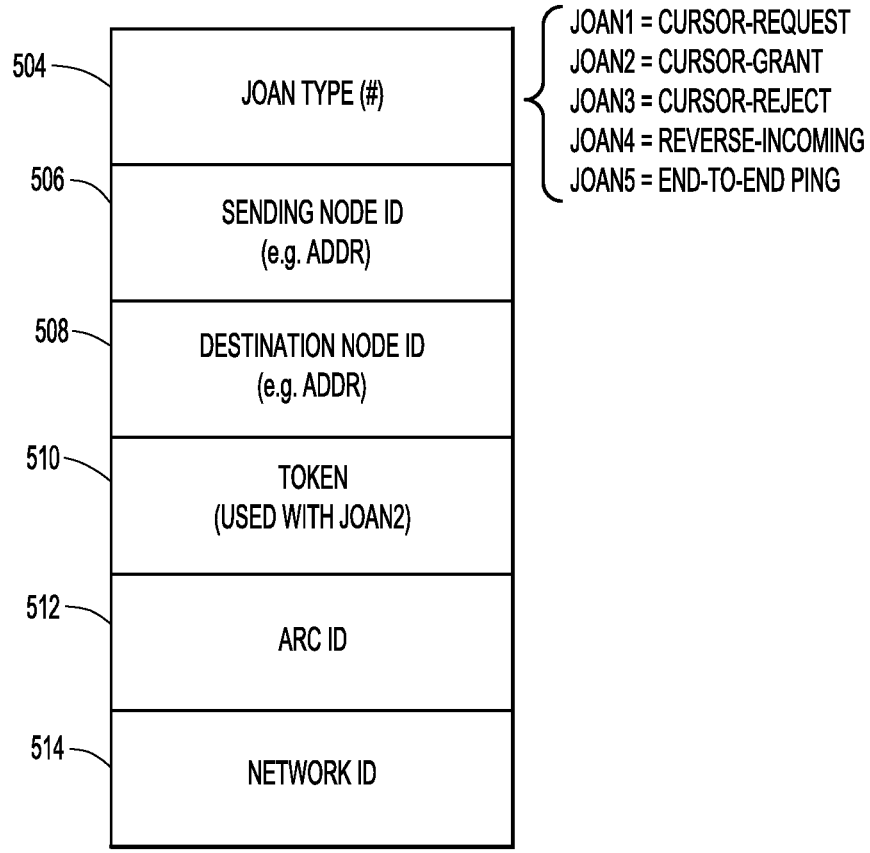
FIG. 5 shows an example format used for various types of data plane management frames that may be emitted and/or received by a node in a routing arc in connection with detecting and/or repairing a routing arc failure.

There are several different types of JOAN frames exchanged between nodes in an arc each suited to a particular scenario, as briefly described below with reference to FIG. 5. FIG. 5 shows an example format 500 used for the various types JOAN frames that may be emitted and/or received by a node in an arc in connection with detecting and/or repairing an arc failure. Format 500 includes:

a. a JOAN frame type/number 504 that indicates the type of JOAN frame that is active. In one embodiment, there are five types of JOAN frames:
   i. JOAN1 frame=Cursor-Request JOAN frame;
   ii. JOAN2 frame=Cursor-Grant JOAN frame;
   iii. JOAN3 frame=Cursor-Reject JOAN frame;
   iv. JOAN4 frame—Reverse-Incoming JOAN frame; and
   v. JOAN 5—End-to-End (ETO) Ping JOAN frame (optional).
b. a sending/emitting node identifier (ID) 506, such as an address of the node originating the JOAN frame;
c. an optional destination node address 508;
d. a token field 510 associated with a JOAN2 frame that is asserted when the JOAN2 frame transits a node currently holding a cursor. An asserted token is representative of the cursor;
e. an arc ID 512 of the arc in which the JOAN frame is active; and
f. a network ID 514 of the arc topology in which the JOAN frame is active;

Each type of JOAN frame is now described briefly, after which several example arc failure scenarios in which the different JOAN frames are used will be described.

JOAN1 frame—Cursor-Request JOAN frame: A node that detects a failure proximate itself, e.g., in one of its links, sends the JOAN1 frame toward an edge node to request possession of the cursor (i.e., to have the cursor transferred from the node initially holding the cursor in the arc to the requesting node). If the requesting node gains possession of the cursor, all network traffic will be directed away from that node and, thus, away from the failure location.

JOAN2 frame—Cursor-Grant JOAN frame: In response to receiving a JOAN1 Cursor-Request frame, an edge node through which network traffic can exit the arc (because the edge node and its connected edge are not broken) sends a JOAN2 Cursor-Grant frame back to the requesting node to indicate that the cursor may be transferred to that node.

JOAN3 frame—Cursor-Reject JOAN frame: This is used in a scenario where an arc experiences multiple spaced apart failures (breakages), such as a double failure scenario. In the double failure scenario, a first node proximate a first failure has already captured the cursor using a JOAN1-JOAN2 frame exchange. A second node proximate a second, subsequent failure sends another JOAN1 (Cursor-Request) frame to gain possession of the cursor. In response to the JOAN1 Cursor-Request frame, the first node sends a JOAN3 (Cursor-Reject) frame back to the second node because the cursor has already been transferred once due to the first failure and cannot be transferred again. On the way back to the second node, the JOAN3 (Cursor-Reject) frame freezes all incoming edges from parent arcs. Once frozen, the incoming edges cannot pass network traffic.

JOAN4 frame—Reverse-Incoming JOAN frame: This is also used in the double failure scenario. The JOAN4 (Reverse-Incoming) frame is sent from a node that both requested the cursor (using JOAN1) and that was rejected (using JOAN3). JOAN4 (Reverse-Incoming) frame reverses each incoming edge (link) from a parent arc, and reverse links for each node in the arc transited by the JOAN4 (Reverse-Incoming) frame beginning with the sending node up to a first of the incoming nodes (i.e., nodes that receive incoming edges from parent arcs) transited by the JOAN4 frame, so that network traffic originating in the arc will be directed to the incoming node (and be directed into the parent arc).

JOAN5 frame—Ping JOAN frame (Optional): The JOAN5 (Ping) frame is a failure-detect frame that is sent back and forth between the edge nodes at opposite ends of an arc. A failure in the arc is detected when one of the JOAN5 (Ping) frames sent from one of edge nodes to the other of the edge nodes is not received at the other of the edge nodes. The JOAN5 (Ping) frame is optional because other mechanisms for detecting failure in an arc may be used.

Network Device—Node

Figure 6:
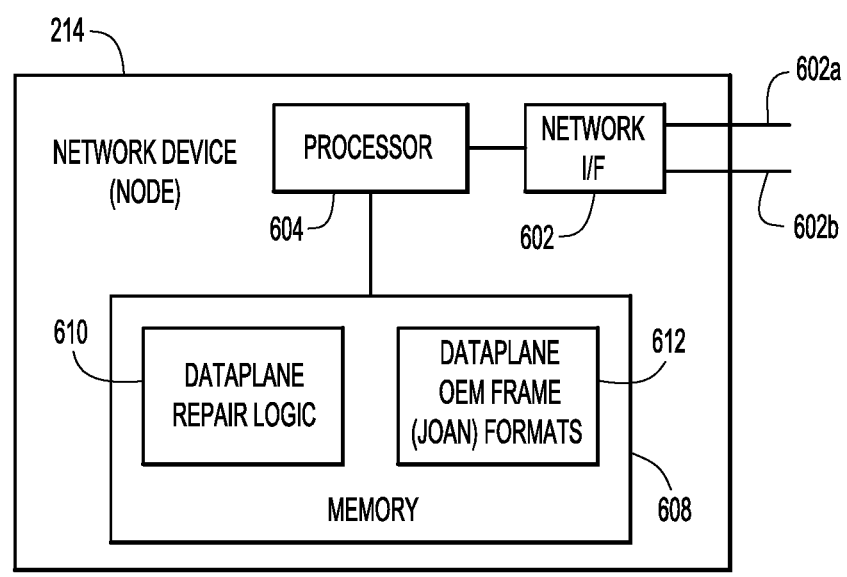
FIG. 6 is a block diagram of an example computer system implemented in a node of a routing arc.

With reference to FIG. 6, there is shown a block diagram of a system 600 implemented in a node, e.g., each of nodes 214, of arc topology 200. System 600 includes a network interface unit 602, a processor 604, and memory 608. The network interface (I/F) unit 602 is, for example, an Ethernet card device to allow the system 600 to communicate over a network, e.g., a wired (Ethernet) network. Network I/F unit 602 may also include wireless connection capability. Network I/F unit 602 supports communication over data links 602a and 602b connected to adjacent nodes in an arc topology and over which network traffic in the form of data packets are exchanged between the adjacent nodes. Data links 602a and 602b may be reversible links as described above so as to transport network traffic to system 600 or away from system 600 under control of processor 604 and Network I/F unit 602. The processor 604 is a microcontroller or microprocessor, for example, configured to execute software instructions stored in the memory 608.

The memory 608 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 608 may comprise one or more computer readable storage media (e.g., a memory device) encoded with software comprising computer executable instructions and when the software is executed (by the processor 604) it is operable to perform the operations described herein. For example, the memory 608 stores or is encoded with instructions for Data Plane Repair Protocol logic 610 to perform failure detect and repair operations based on a data plane protocol (i.e., an exchange of data plane management messages) as described herein. In addition, memory 608 stores data plane management frame formats 612, e.g., JOAN frame formats, used by the Data Plane Repair Protocol logic 610 to construct and interpret data plane management frames to be sent from system 600 and received by system 600 over links 602a and 602b.

Single Failure in Arc

Figure 7:
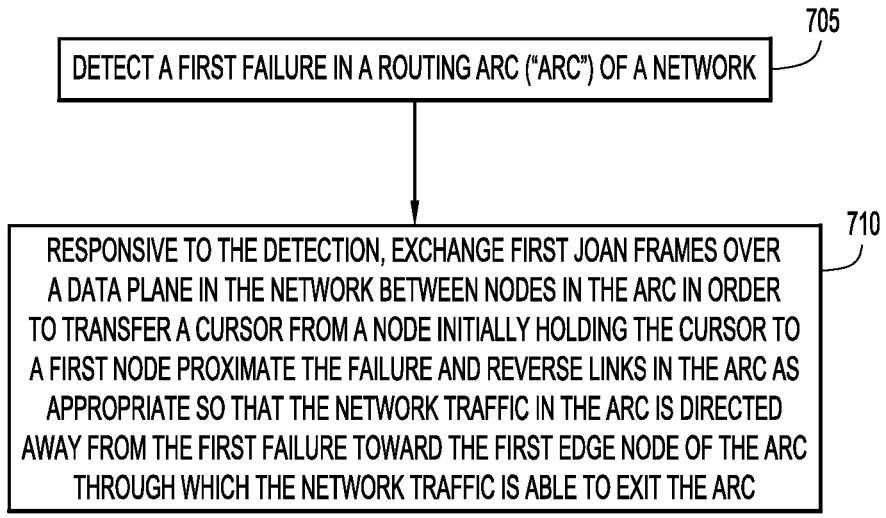
FIG. 7 is a flowchart of an example method of handling a first failure in a routing arc using data plane management frames.

Turning now to FIG. 7, there is shown a flowchart of an example method 700 of detecting and handling a failure in an arc using JOAN frames. As described above, an example configuration of one of arcs 210 is depicted in FIG. 3 at 300, wherein arc 300 includes nodes A-E connected in sequence by reversible links Rev oriented away from node C, initially holding a cursor, toward one of first and second edge nodes A, E (and their corresponding edges 302A, 302E) at opposite ends of the arc and through which the network traffic exits the arc.

At 705 a first node proximate a first failure in the arc detects the first failure.

At 710, responsive to the failure detection, the nodes in the arc exchange first management frames, e.g., JOAN frames, over a data forwarding plane between nodes within the arc. The exchange of JOAN frames transfers the cursor from the node initially holding the cursor to the first node proximate the first failure and reverse links in the arc as appropriate so that the network traffic in the arc is directed away from the first failure toward the first edge node of the arc through which the network traffic is able to exit the arc. The exchange of first JOAN frames in the data plane in 710 results in repair/rerouting in the arc without any interaction with a network controller of the network, i.e., no OEM management frames are exchanged with the network controller (e.g., network controller 220).

Figure 8:
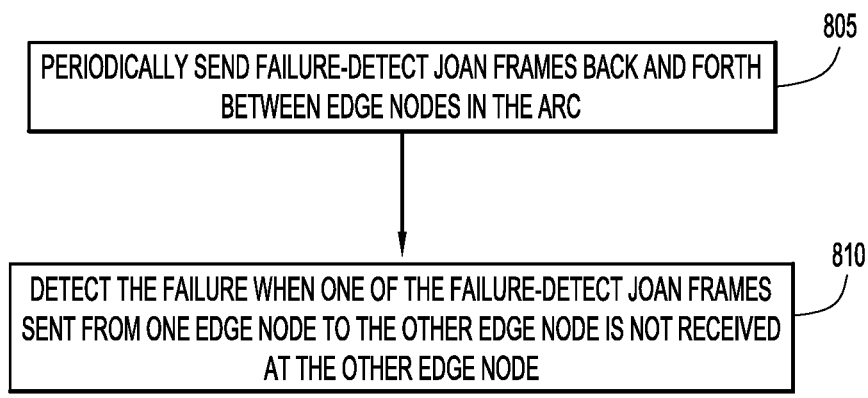
FIG. 8 is a flowchart of example operations expanding on a failure detection operation of the method of FIG. 7.

FIG. 8 is a flowchart of example operations expanding on failure detection operation 705 of method 700.

At 805, first and second edge nodes of the arc periodically send Ping (i.e., failure-detect) JOAN frames back and forth between themselves.

At 810, a failure (e.g., the first failure) is detected in the arc when one of the failure-detect JOAN frames sent from one of the first and second edge nodes to the other of the first and second edge nodes is not received at the other of first and second edge nodes. The failure is manifested as a break in the arc that prevents the failure-detect JOAN frame from reaching the designated edge node.

Figure 9:
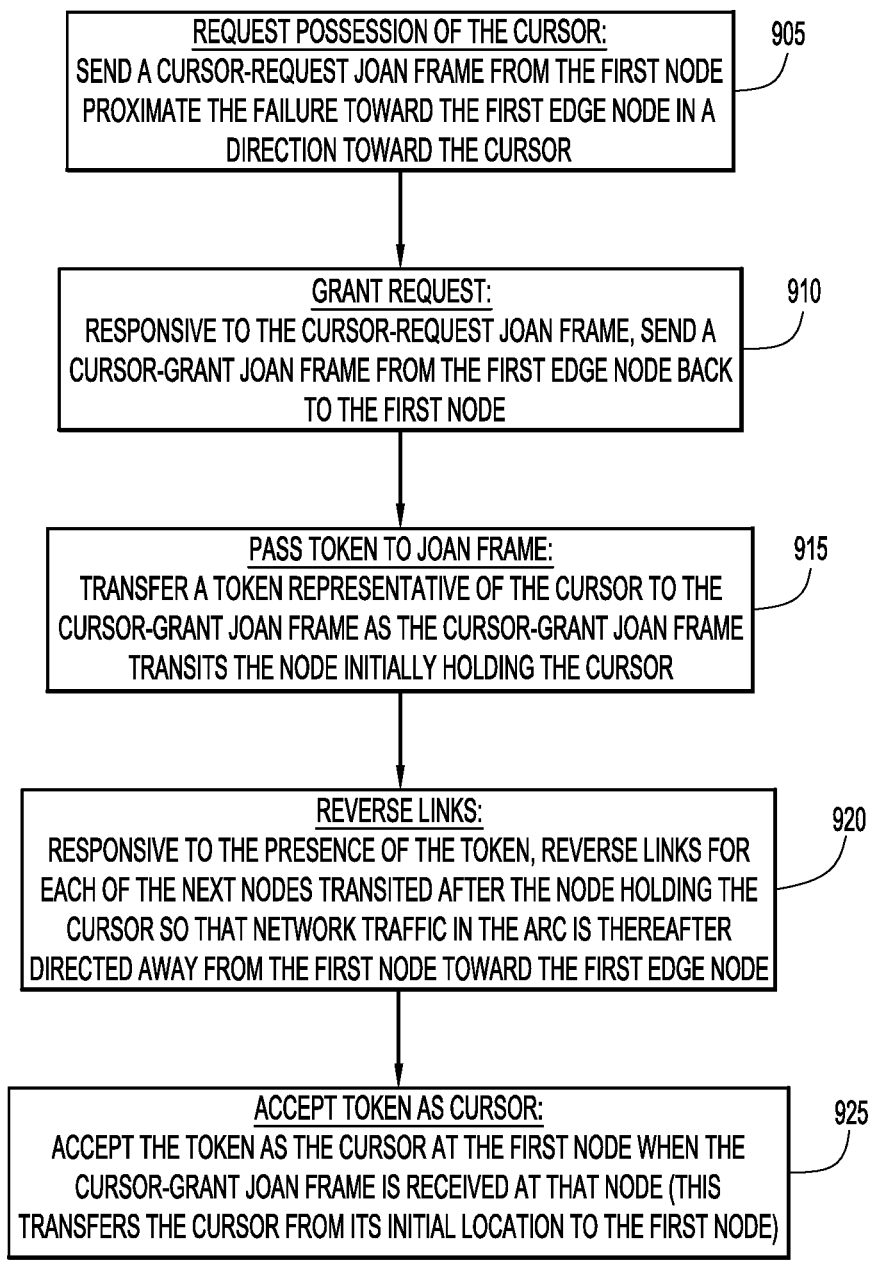
FIG. 9 is a flowchart of an example method expanding on the use of data plane management frames in the method of FIG. 7.

FIG. 9 is a flowchart of an example method expanding on the exchanging JOAN frames operation 710 used to handle a detected failure in the arc (i.e., the failure detected at operation 705). FIG. 9 is described also with reference to FIGS. 10-15, sequentially. FIGS. 10-15 depict a first example arc failure scenario in which an arc 1000 (corresponding to one of arcs 210 in FIG. 2) of arc topology 200 acquires a first failure F1 on proximate the right end of the arc. The example first arc failure scenario is referred to as a single failure scenario.

Figure 10:
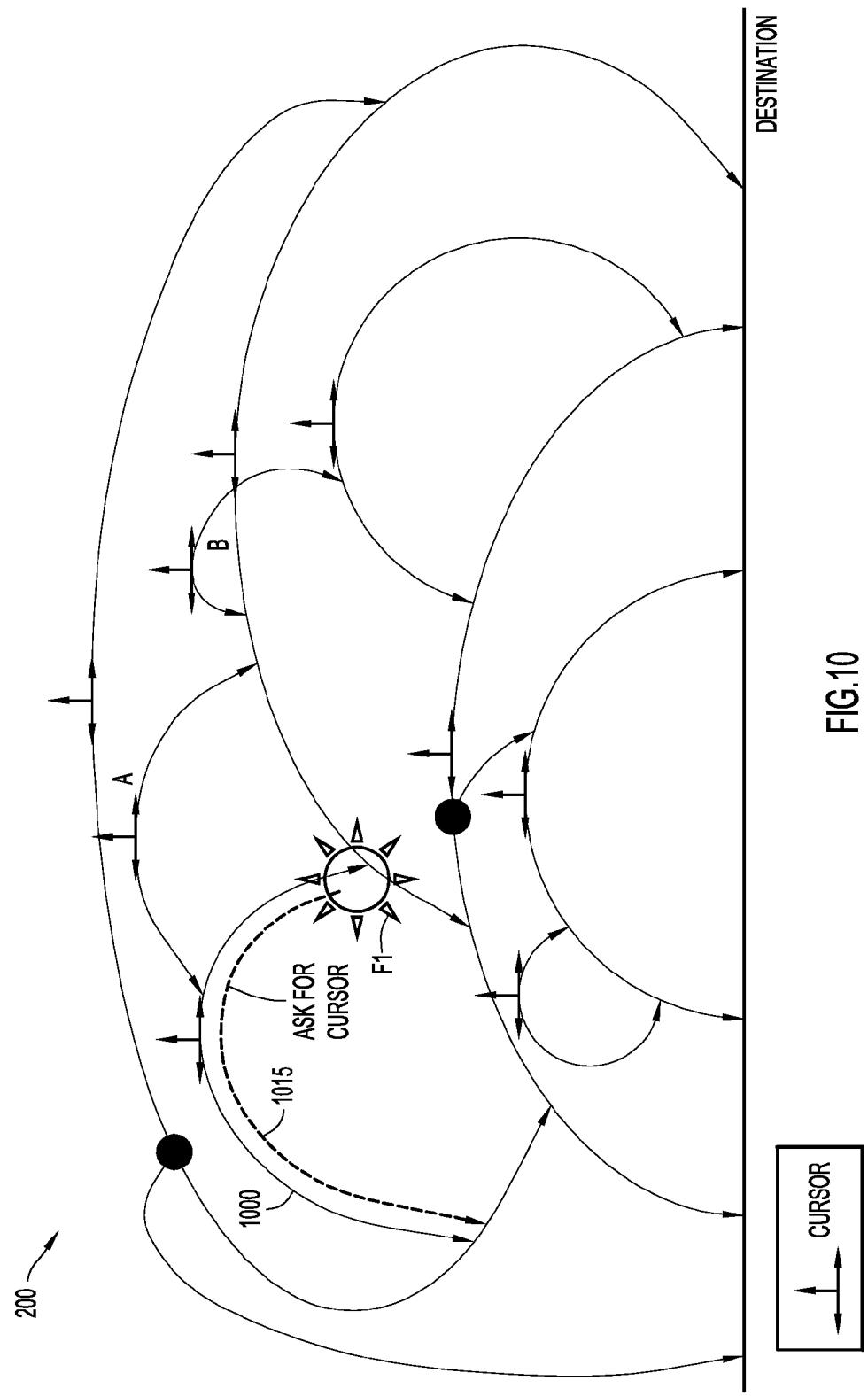
FIGS. 10-15 collectively depict a single arc failure scenario described in connection with FIG. 9 and in which a routing arc experiences a first/single failure.

At 905, the first node proximate the detected first failure (as referenced above in connection with operation 705) sends a Cursor-Request JOAN frame toward a first edge node in a direction that causes that JOAN frame to transit the node initially holding the cursor. In the example of FIG. 10, a (first) node proximate failure F1 sends the Cursor-Request JOAN frame to the left end of arc 1000 as indicted at left arrow 1015. The failure location F1 becomes a JOAN source through which network traffic is unable to pass (i.e., is unable to exit arc 1000) and that sends the Cursor-Request JOAN frame to the left end of arc 1000.

Figure 11:
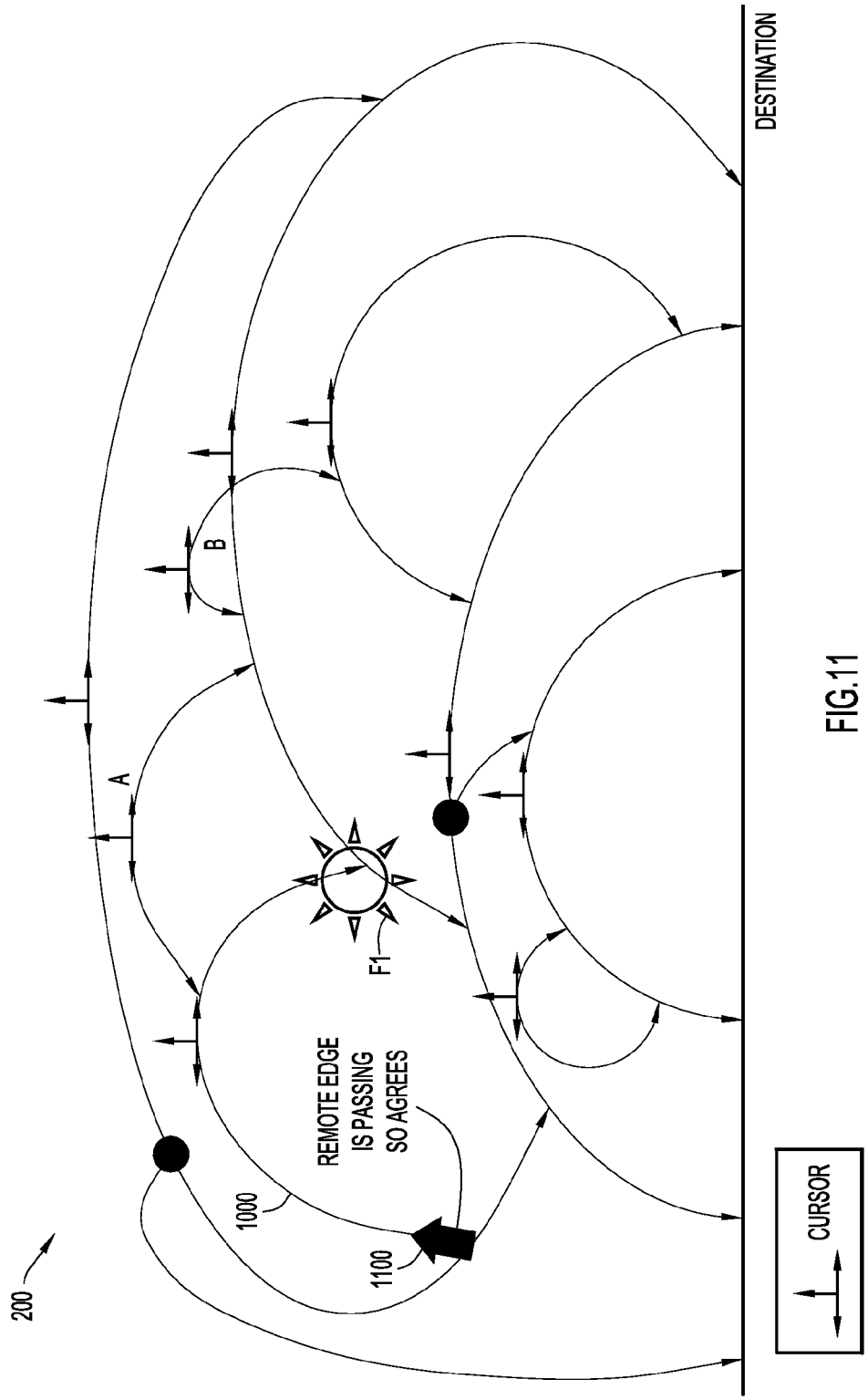

At 910, responsive to the Cursor-Request JOAN frame, the first edge node sends a Cursor-Grant JOAN frame back to the first node if the first edge node and its corresponding edge are able to pass network traffic, i.e., if network traffic is able to exit the arc through the first edge node and its edge. In the example of FIG. 11, the first edge node (on the left end of arc 1000, but not specifically shown) is still able to pass network traffic so it accepts the Cursor-Request JOAN frame and echoes a response, i.e., the Cursor-Grant JOAN frame, to the right end of the arc as indicted at right arrow 1100.

Responsive to the Cursor-Grant JOAN frame transiting the node initially holding the cursor and next nodes thereafter (including the first node), the following operations 915, 920, and 925 occur, as described below.

Figure 12:
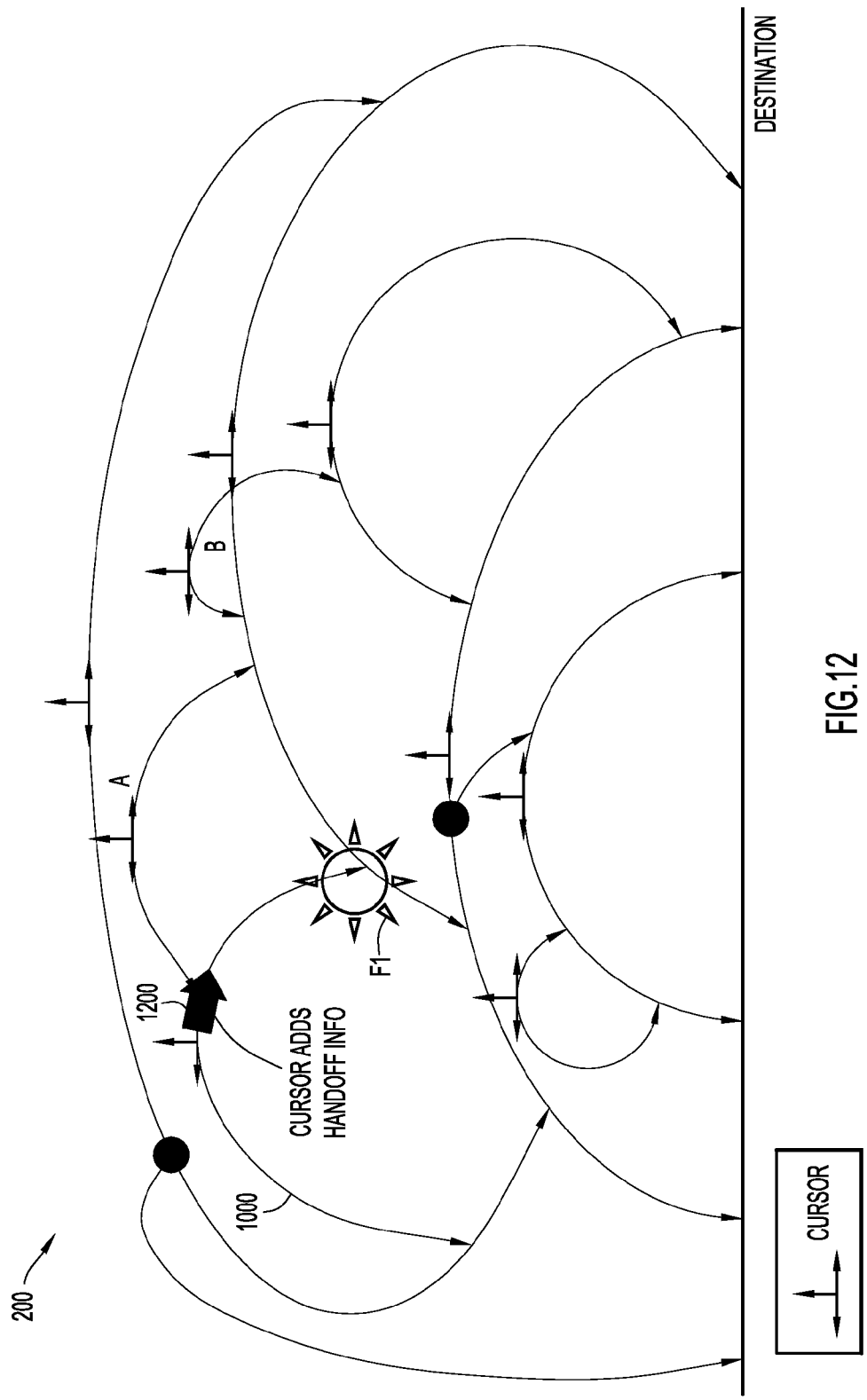

At 915, the node initially holding the cursor transfers a token representative of the cursor to the Cursor-Grant JOAN frame (i.e., asserts the token in field 510 of the Cursor-Grant JOAN frame) as the Cursor-Grant JOAN frame transits the node initially holding the cursor. In the example of FIG. 12, on the way back to the right end of arc 1000, the Cursor-Grant JOAN frame accepts the cursor as a token, i.e., the cursor/token handoff from the node initially holding the cursor is indicated at arrow 1200.

Figure 13:
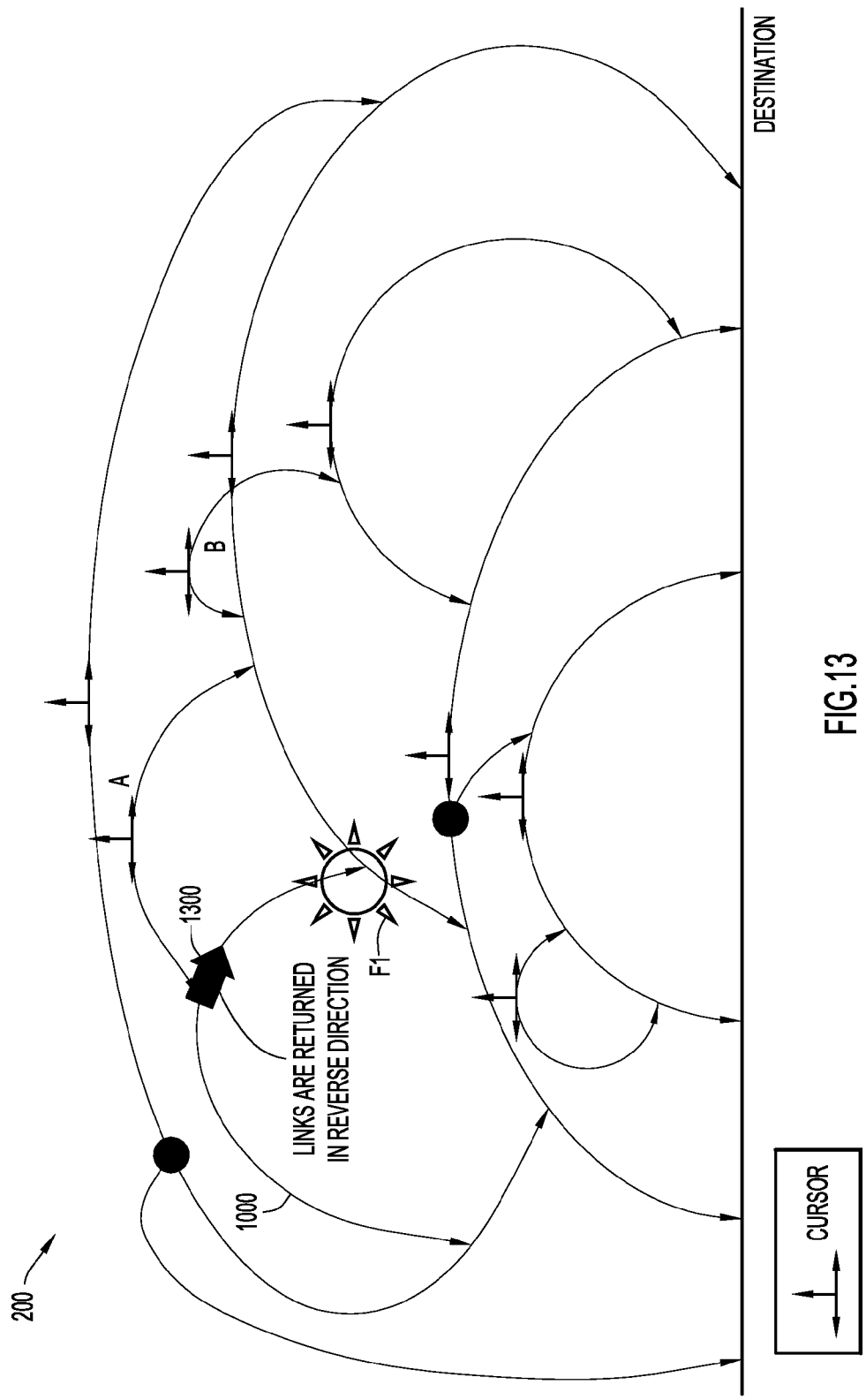

At 920, the next nodes transited by the Cursor-Grant JOAN frame, after the node initially holding the cursor is transited, causes each of the next nodes to reverse their links so that network traffic in the arc is thereafter directed away from the first node toward the first edge node. Each next node reverses its links responsive to the presence of the token in the Cursor-Grant JOAN frame. In the example of FIG. 13, right arrow 1300 represents (i) the Cursor-Grant JOAN frame as it transits the next nodes, and (ii) the reversal of the links of the next node (which become left-pointing links). In other words, the token causes all of the next nodes to return their links toward the old (initial) cursor location.

Figure 14:
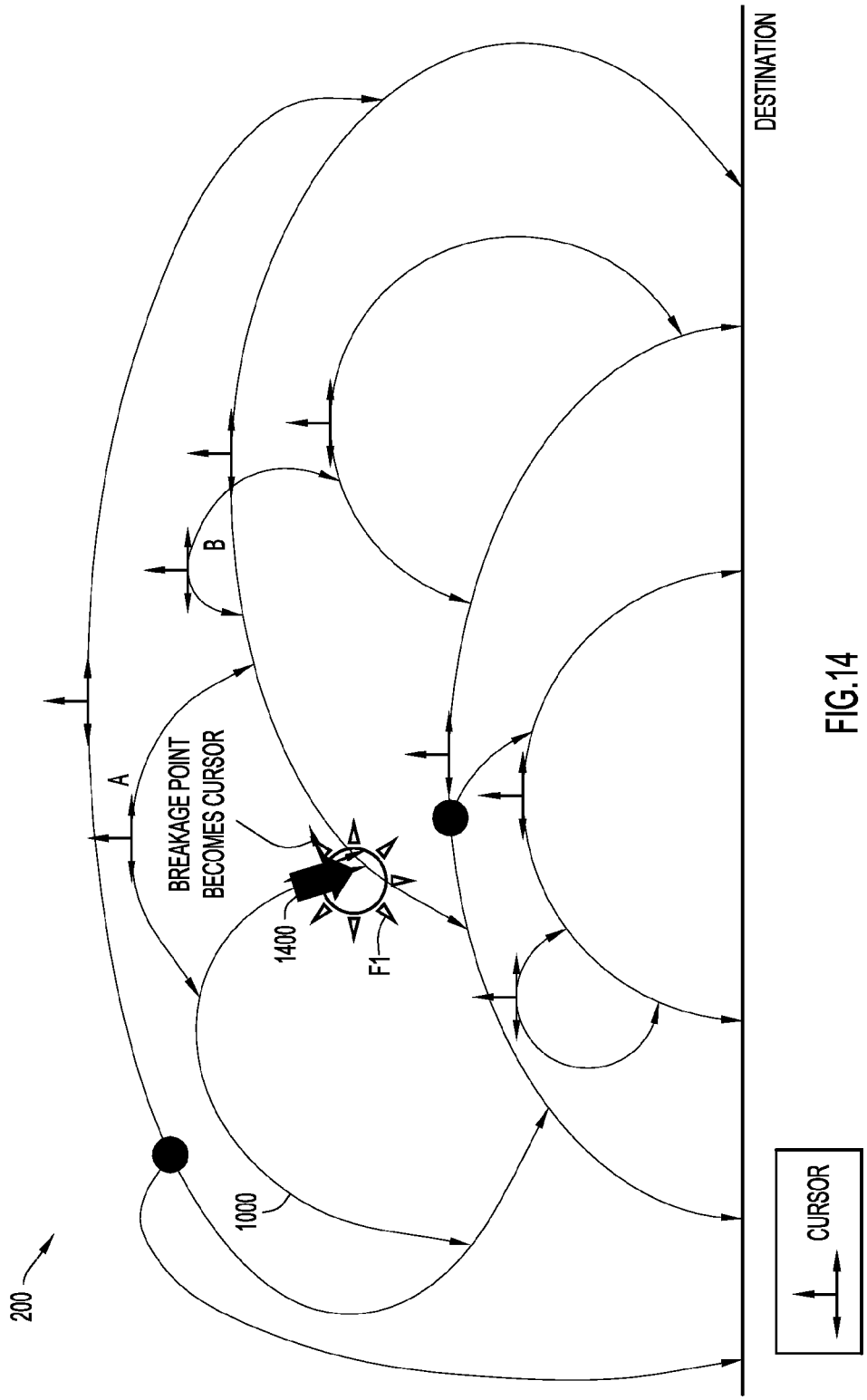

At 925, the first node accepts the token in the Cursor-Grant JOAN frame as the cursor when the Cursor-Grant JOAN frame is received at the first node. In the example of FIG. 14, receipt of the Cursor-Grant JOAN frame at the first node and the resulting acceptance/transfer of the token/cursor are represented at right arrow 1400. Also, the cursor is now located proximate the failure F1, i.e., the breakage point is now proximate the cursor.

Figure 15:
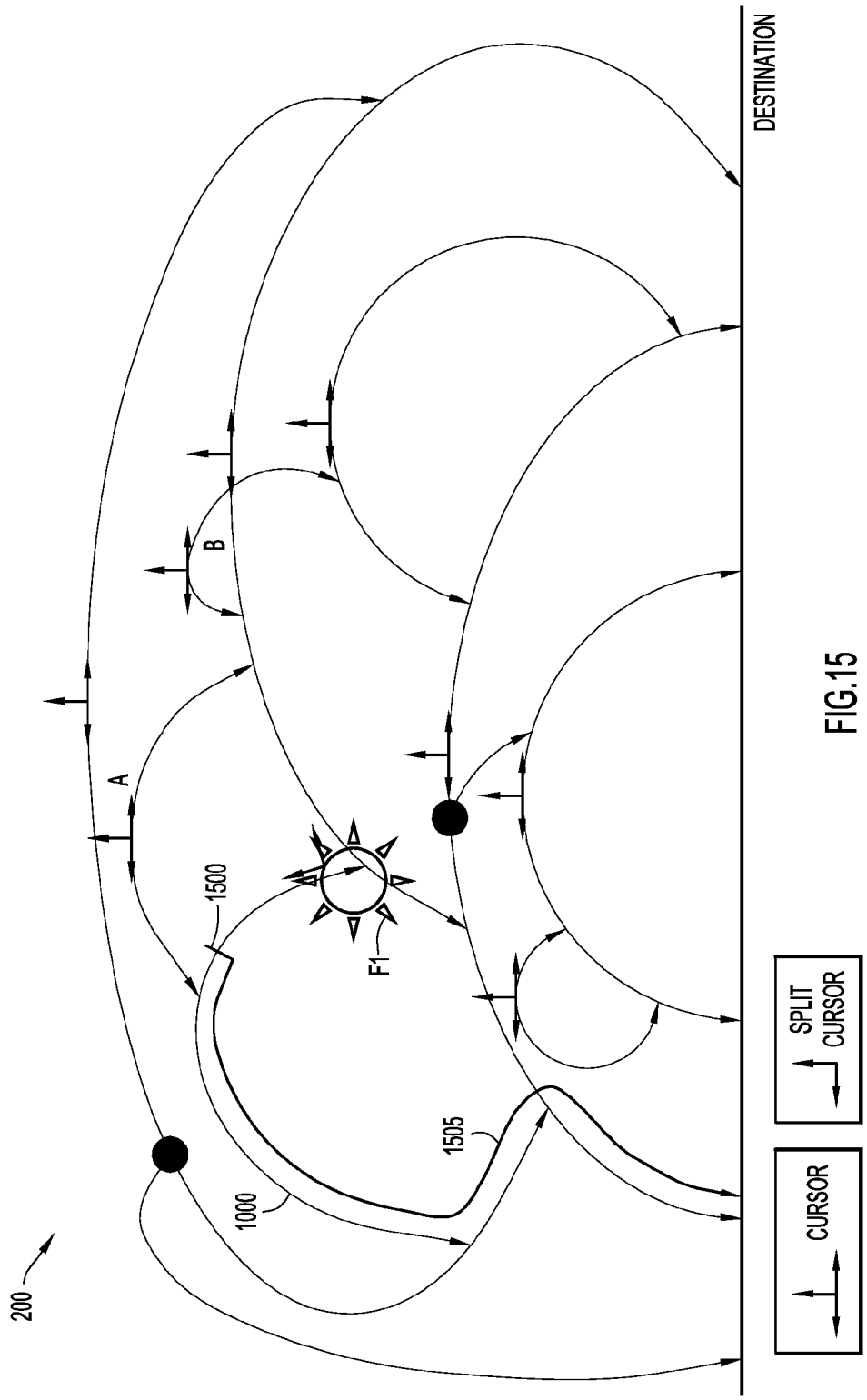

As a result of the above operations, all links are reoriented away from the location of the failure. In the example of FIG. 15, network traffic originating at location 1500 in arc 1000 flows along indicated path 1505 away from failure F1 to the destination. The cursor at the right edge of arc 1000 is essentially a split cursor oriented inwards.

Double Failure in Arc

Figure 16:
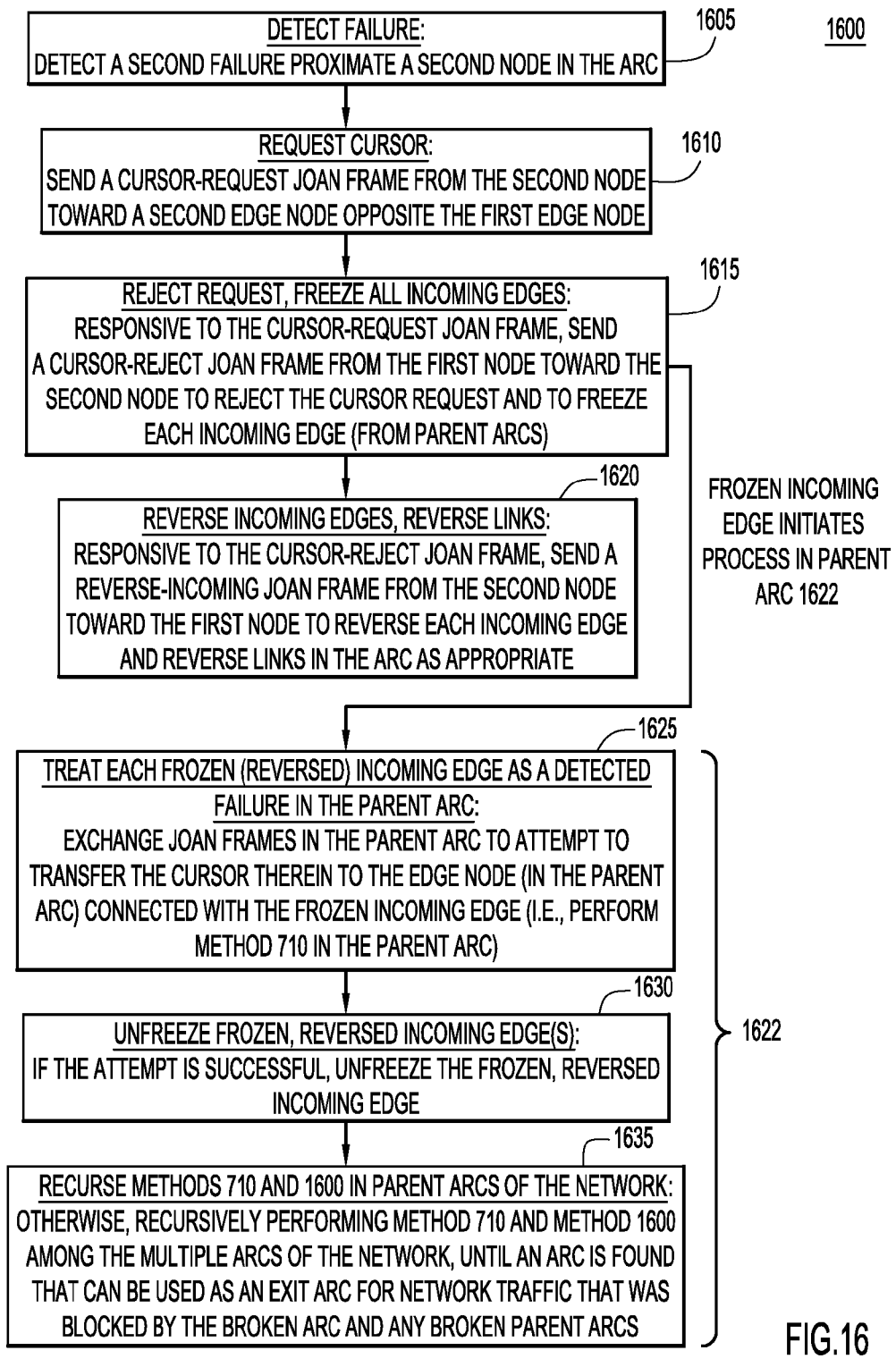
FIG. 16 is a flowchart of an example method of detecting a second failure in a routing arc and exchanging second management frames within that routing arc to handle the second failure.

FIG. 16 is a flowchart of an example method 1600 of detecting a second failure in an arc and exchanging second JOAN frames within that arc to handle the second failure, i.e., method 1600 handles two failures in the same arc so that network traffic in that arc may be rerouted to the destination. When an arc experiences a first failure, method 700 is executed. Then, if the arc experiences a second failure, method 1600 is executed.

Operations of method 1600 are described below also with reference to FIGS. 17-26. FIGS. 17-26 depict a second example arc failure scenario in which arc 1000 acquires a second failure F2 after first failure F1. This failure scenario is referred to as a "second error in the same arc" failure scenario.

It is assumed that the arc that experiences the second failure may include one or more incoming nodes each connected with a corresponding incoming edge of a corresponding parent arc. Under normal operation, i.e., in the absence of failures in the arc, the parent arc directs network traffic in that parent arc toward the corresponding incoming node.

Figure 17:
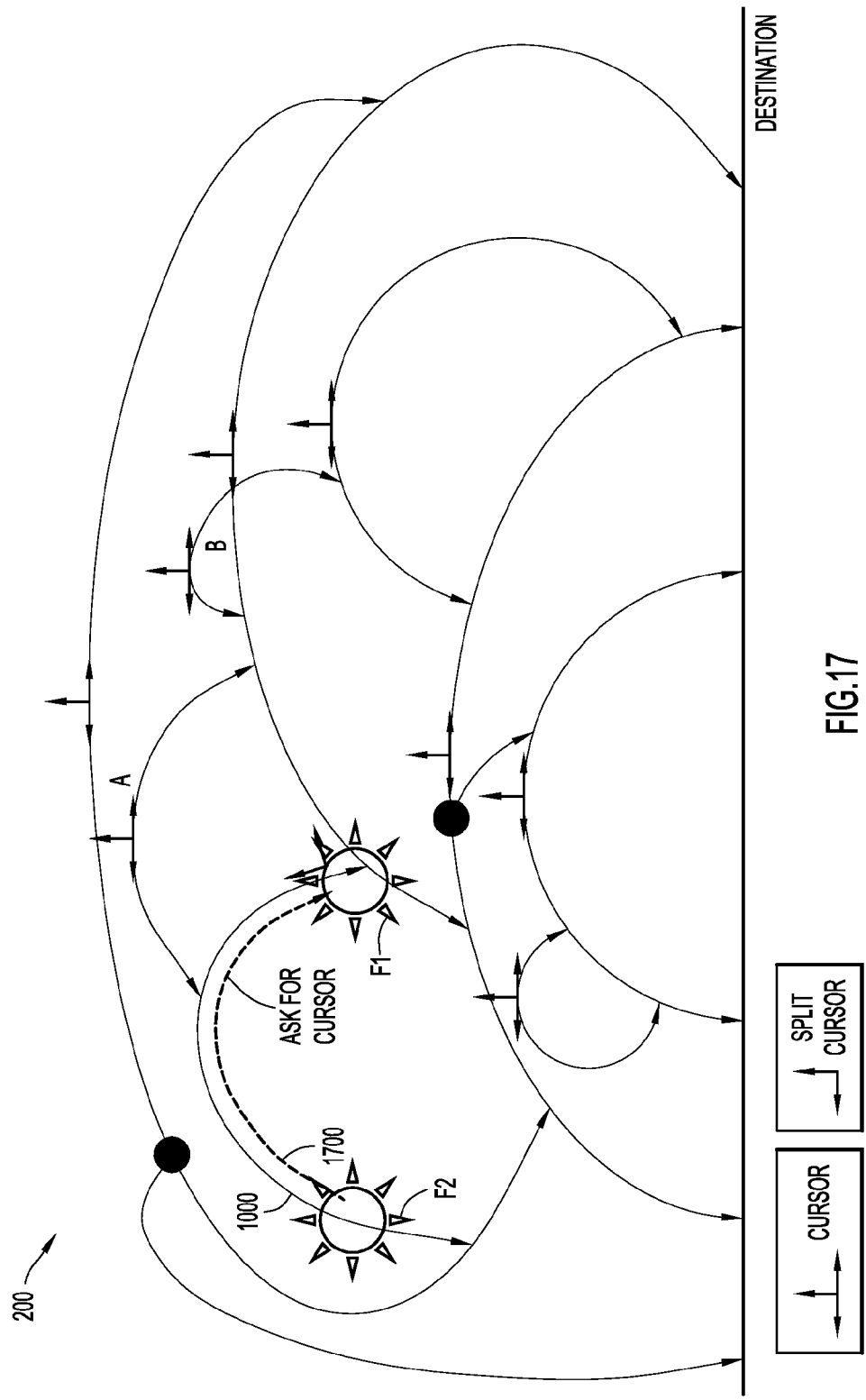
FIGS. 17-26 collectively depict a double arc failure scenario described in connection with FIG. 16 and in which a routing arc acquires a second failure after a first failure.

At 1605, a second failure is detected proximate a second node in the arc that is spaced apart from the first failure proximate the first node. In the example of FIG. 17, failure F2 located to the left of failure F1 in arc 1000 is detected.

Responsive to the second failure being detected, second JOAN frames (as opposed to the "first JOAN frames" exchanged responsive to the first failure in method 700) are exchanged between the nodes in the arc. In summary, the exchange of second JOAN frames will: freeze each incoming edge to prevent network traffic in the corresponding parent arc from entering the arc through the frozen incoming edge, reverse each incoming edge so that network traffic originating in the arc and transiting the corresponding incoming node will be directed toward the corresponding parent arc, and reverse links in the arc as appropriate so that all network traffic originating in the arc is directed to incoming edges. These and further effects will become apparent from this detailed description of method 1600.

At 1610, responsive to the second failure being detected, the second node sends a Cursor-Request JOAN frame toward the second edge node. In the example of FIG. 17, a (second) node proximate failure F2 (not explicitly shown in FIG. 17) becomes a JOAN source that sends the Cursor-Request JOAN frame (to acquire cursorship) to the right end of arc 1000 as indicted at right arrow 1700.

Figure 18:
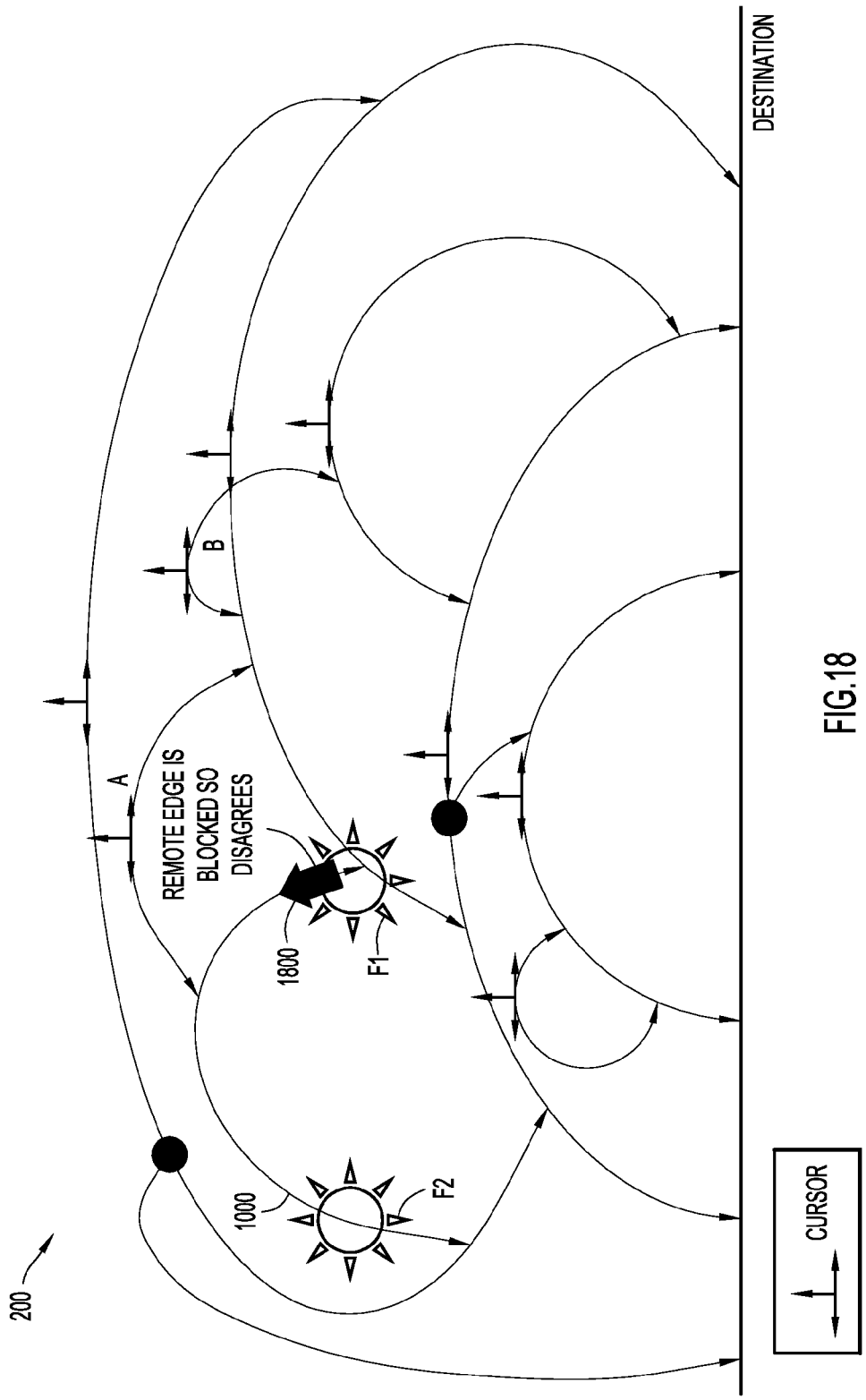
Figure 19:
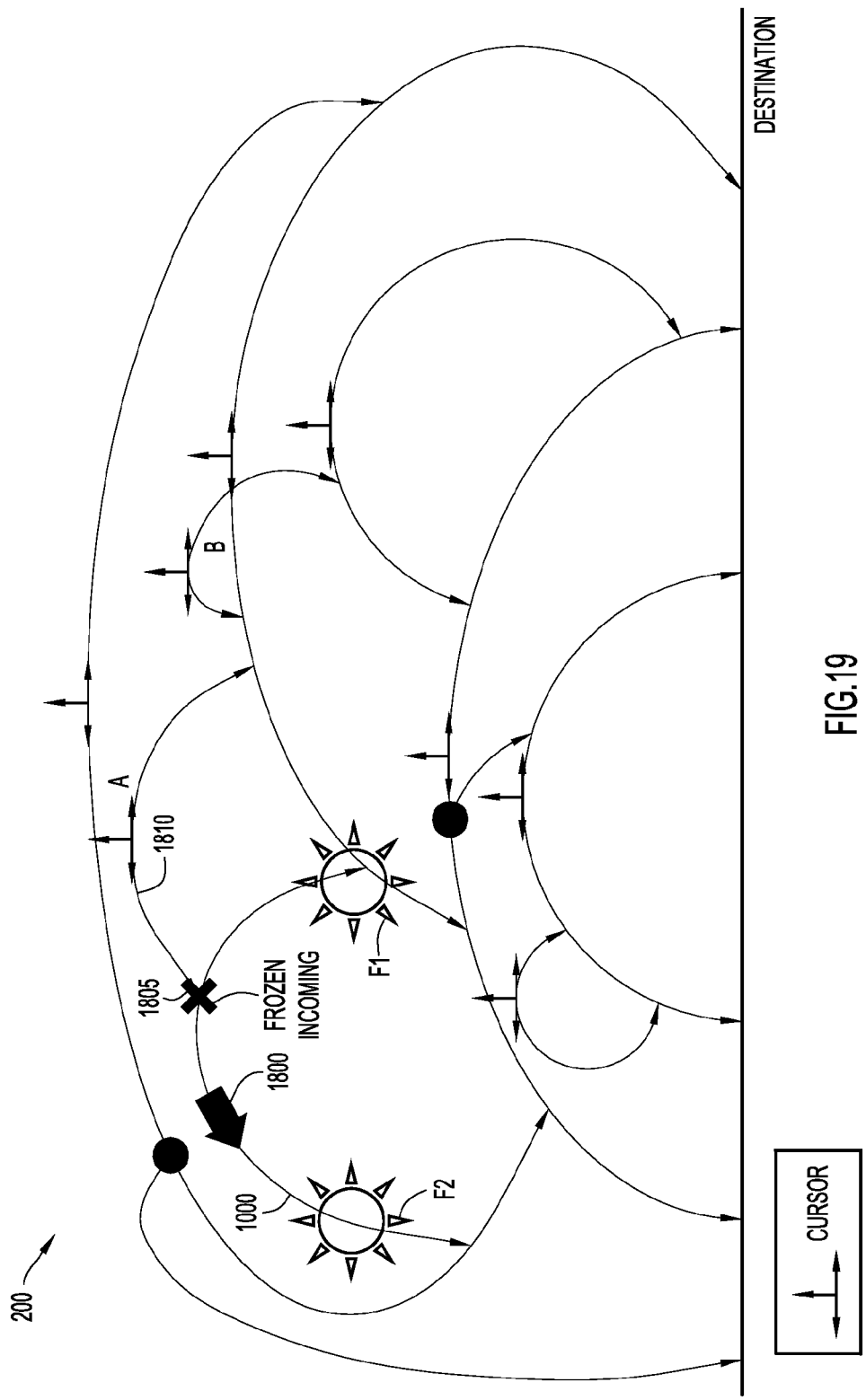

At 1615, responsive to the Cursor-Request JOAN frame, the first node proximate the first failure sends a Cursor-Reject JOAN frame toward the second node indicating the cursor cannot be transferred (because of the first failure proximate the second node) and to freeze each incoming edge in the corresponding incoming node transited by the Cursor-Reject JOAN frame. In the example of FIG. 18, the left arrow 1800 represents the Cursor-Reject JOAN frame sent from the first node proximate failure F1 toward the second node proximate failure F2. In other words, since the remote edge (proximate failure F1 in FIG. 18) is a already a failure point, it cannot accept the Cursor-Request JOAN frame from the node proximate failure F2, so it sends a negative response, i.e., the Cursor-Reject JOAN frame 1800 back to failure F2. In the example of FIG. 19, the Cursor-Reject JOAN frame freezes incoming edge 1805 of parent arc 1810, as indicated by the "X" coinciding with the incoming edge.

Figure 20:
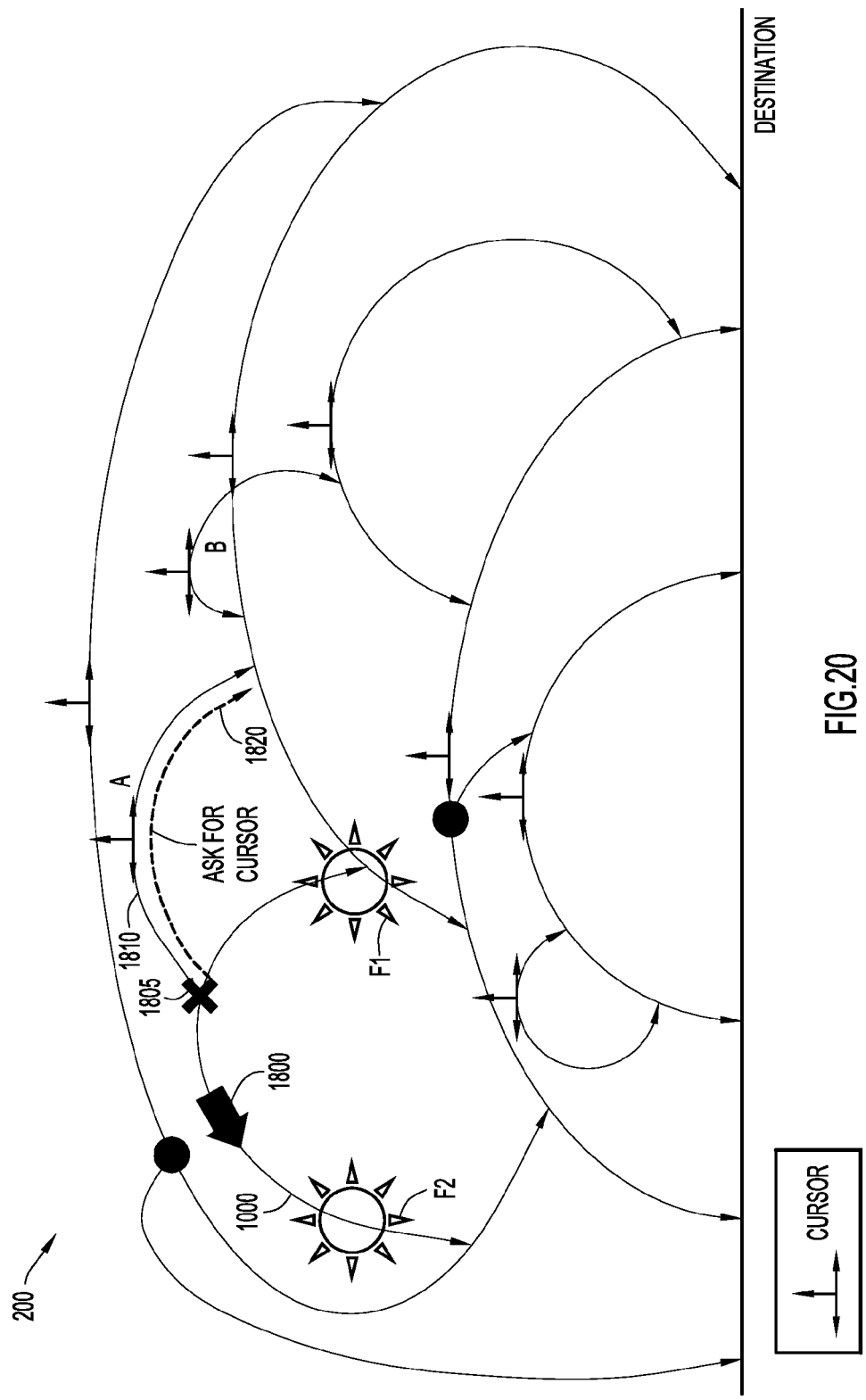

If the Cursor-Reject JOAN frame emitted in 1615 results in a frozen incoming edge from a parent arc, the parent arc treats (designates) that frozen edge as a detected failure/breakage in the parent arc, which initiates a series of operations 1622, some of which are performed in the parent arc, that are executed concurrently with a next operation 1620 (following from operation 1615) that is performed in the arc in which the second failure was detected. In the example of FIG. 20, a right arrow 1820 in parent arc 1810 represents the initiation of operations 1622 in the parent arc responsive to incoming edge 1805 of the parent arc being frozen. Concurrent operations 1622 in the parent arc will be described in detail below after operation 1620 is described. Note that freezing and returning operations are both interpreted as breakages in parent arcs, so methods 700 and 1600 will recurse in the parent arcs as the interpreted breakages in the parent arcs try to acquire possession of the cursor in their respective arcs.

At 1620, responsive to the Cursor-Reject JOAN frame, the second node sends a Reverse-Incoming JOAN frame toward the first node to:
a. reverse (i.e., return) each incoming edge in the corresponding incoming node transited by the reverse-incoming JOAN frame; and
b. reverse links for each node in the arc transited by the Reverse-Incoming JOAN frame from the second node up to a first of the incoming nodes (that receive incoming edges) transited by the Reverse-Incoming JOAN frame.

Figure 21:
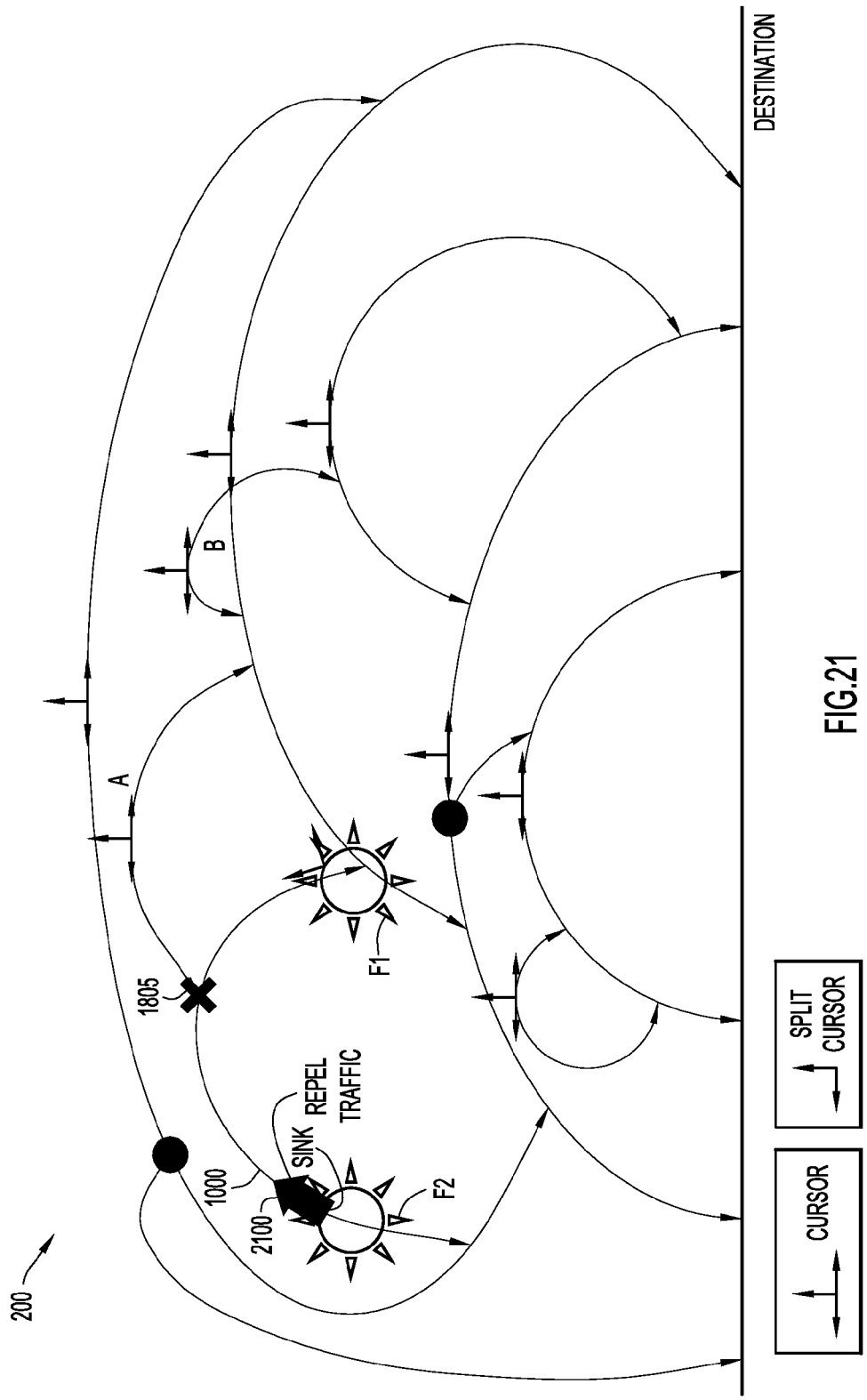
Figure 22:
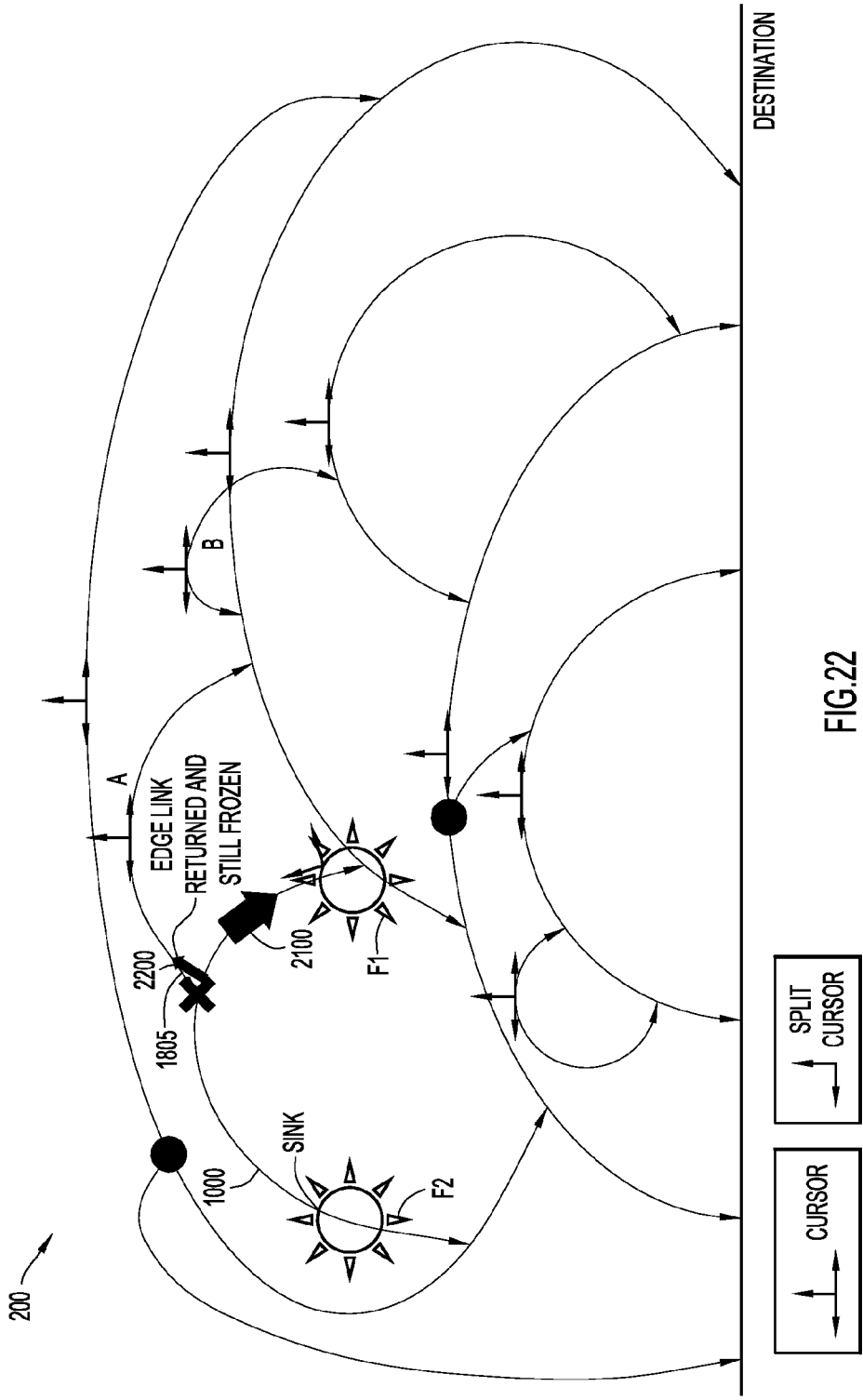

In the example of FIG. 21, a right arrow 2100 represents the Reverse-Incoming JOAN frame sent from the second node proximate failure location F2 (now a sink), which reverses each of the links transited by that JOAN frame from the second node up to the first incoming edge 1805. Also, in the example of FIG. 22, Reverse-Incoming JOAN frame 2100 reverses (or turns-around) incoming edge 1805 (so that it becomes an "outgoing" edge relative to arc 1000) as indicted at right arrow 2200 as that JOAN frame travels to the right end of arc 1000.

As mentioned above, a frozen incoming edge is treated (designated) as a failure in the corresponding parent arc and initiates concurrent operations 1622 that are performed at least in part in the parent arc. Operations 1622 comprise operations 1625, 1630, and 1635, now described in detail.

At 1625, each reversed incoming edge (from a corresponding parent arc) is treated as a detected failure in the corresponding parent arc. Therefore, nodes in the parent arc exchange a second instance of the first JOAN frames in accordance with operations 710 described above to attempt to transfer the cursor to an edge node of the parent arc corresponding to the frozen, reversed incoming edge. Returning to the example of FIG. 20, right arrow 1820 in parent arc 1810 represents a Cursor-Request JOAN frame sent by an edge node corresponding to edge 1805 in parent arc 1810 to request the cursor from the node initially holding the cursor in the parent arc.

Figure 23:
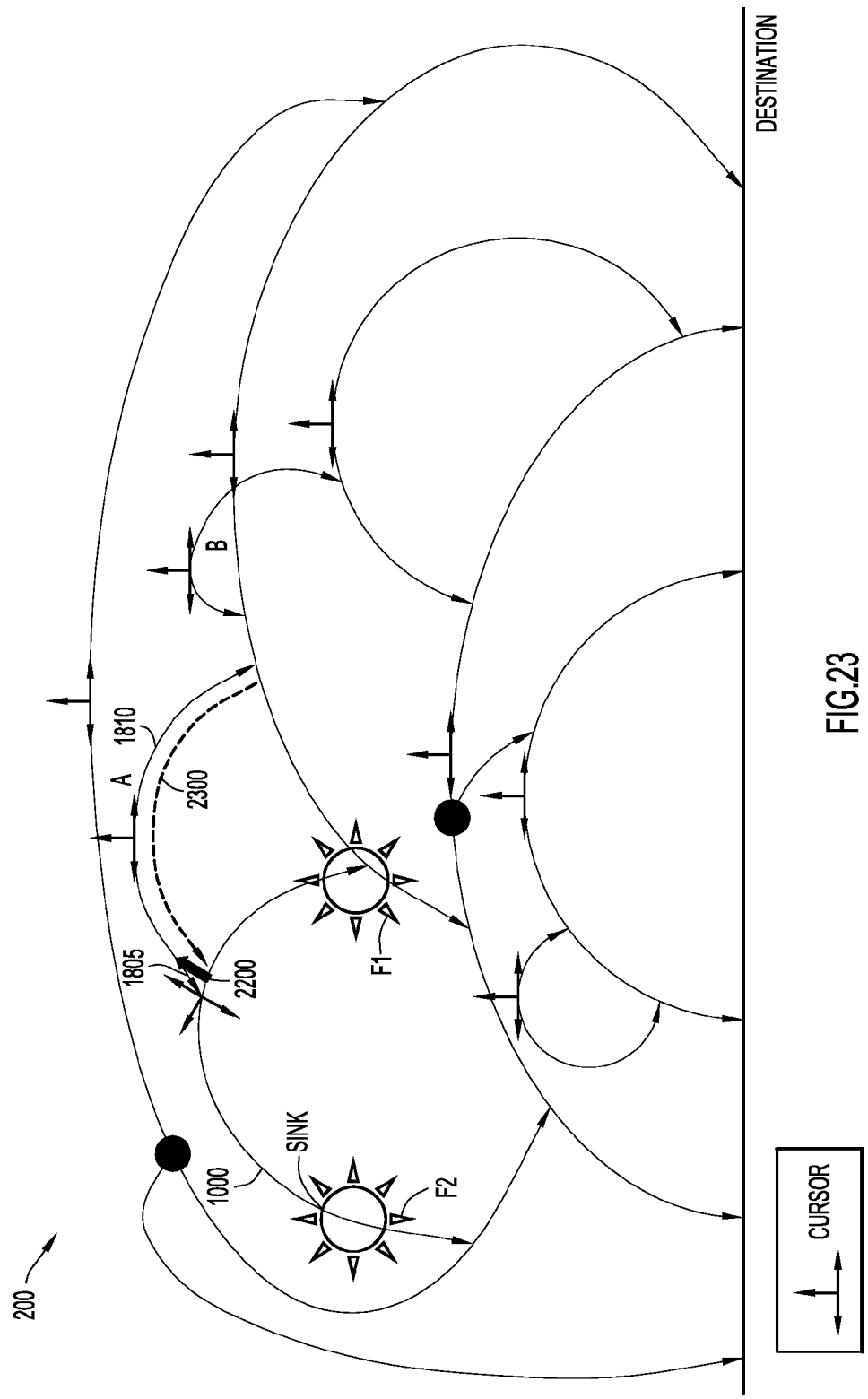
Figure 24:
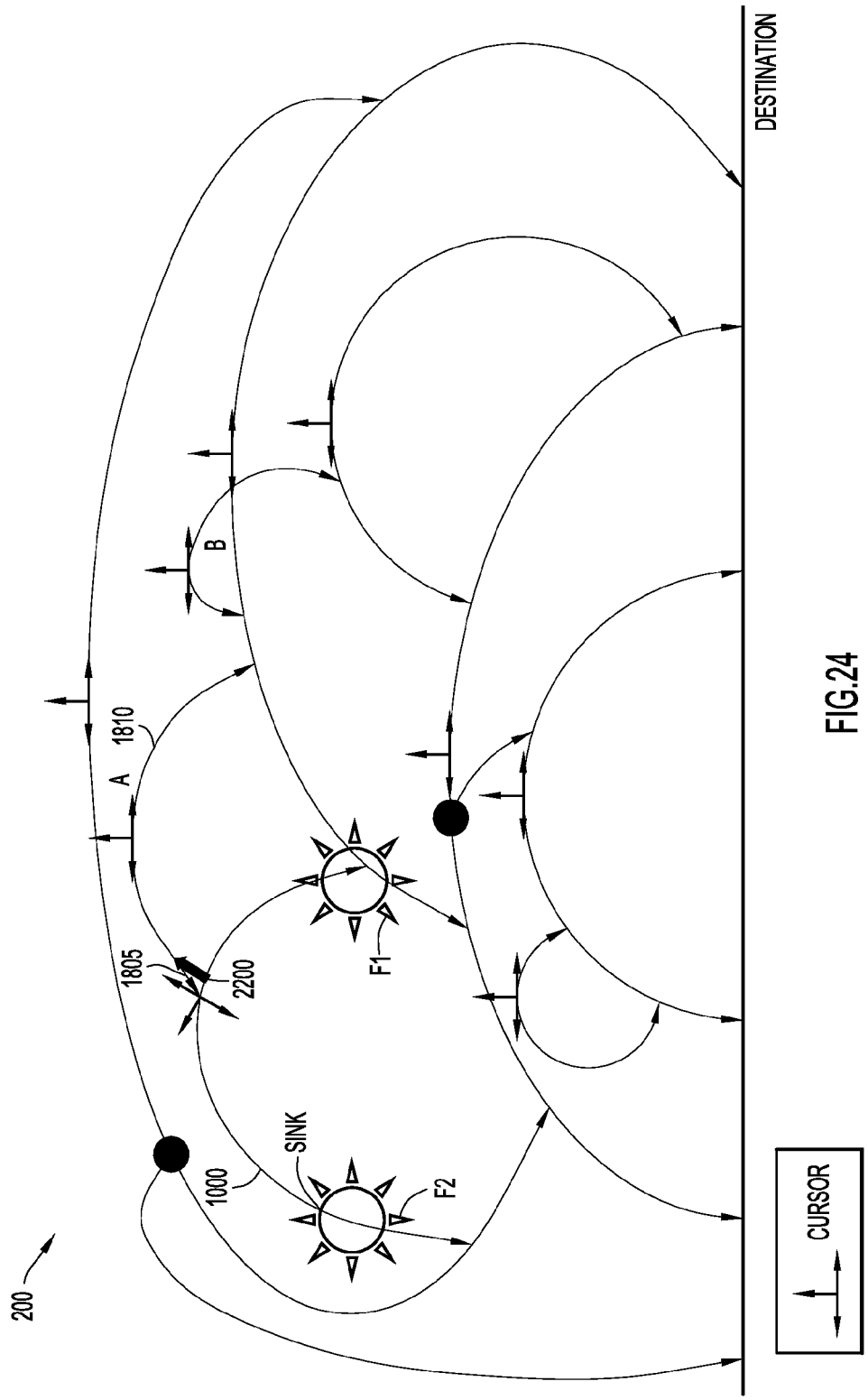

At 1630, if the attempt to transfer the cursor in the parent arc is successful using the exchange of the second instance of the first JOAN frames, the heretofore frozen, reversed incoming edge is unfrozen. In the example of FIG. 23, a left arrow 2300 represents a Cursor-Grant JOAN frame successfully transferring possession of the cursor in parent arc 1810 to the edge node of the parent arc, i.e., the attempt to transfer the cursor in the parent arc was successful, and the parent arc unfreezes incoming edge (now reversed) 1805. All other parent arcs recursively freeze their incoming edges. In the example of FIG. 24, the successfully transferred cursor is depicted coincident with edge 1805 of parent arc 1810. Note that in the case of a double breakage that occurs later in the parent arc, the returned link for edge 1805 would be refrozen.

As a result of the above operations, all network traffic originating in the arc with the two failures (e.g., arc 1000) is directed toward and into the parent arc (e.g., parent arc 1810) through the unfrozen, reversed incoming edge (e.g., incoming edge 1805). Once in the parent arc, the network traffic follows a path to the destination.

Figure 25:
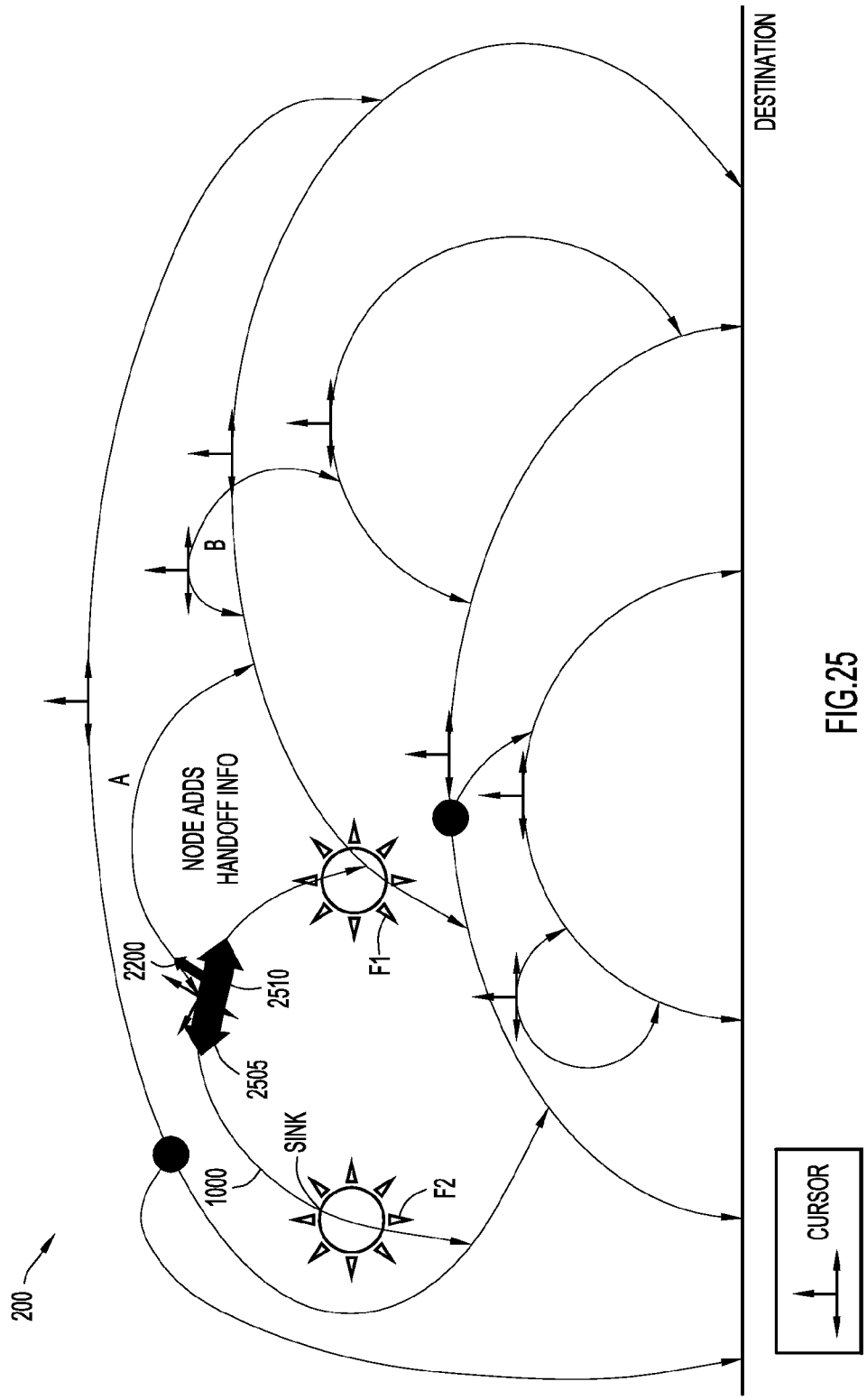
Figure 26:
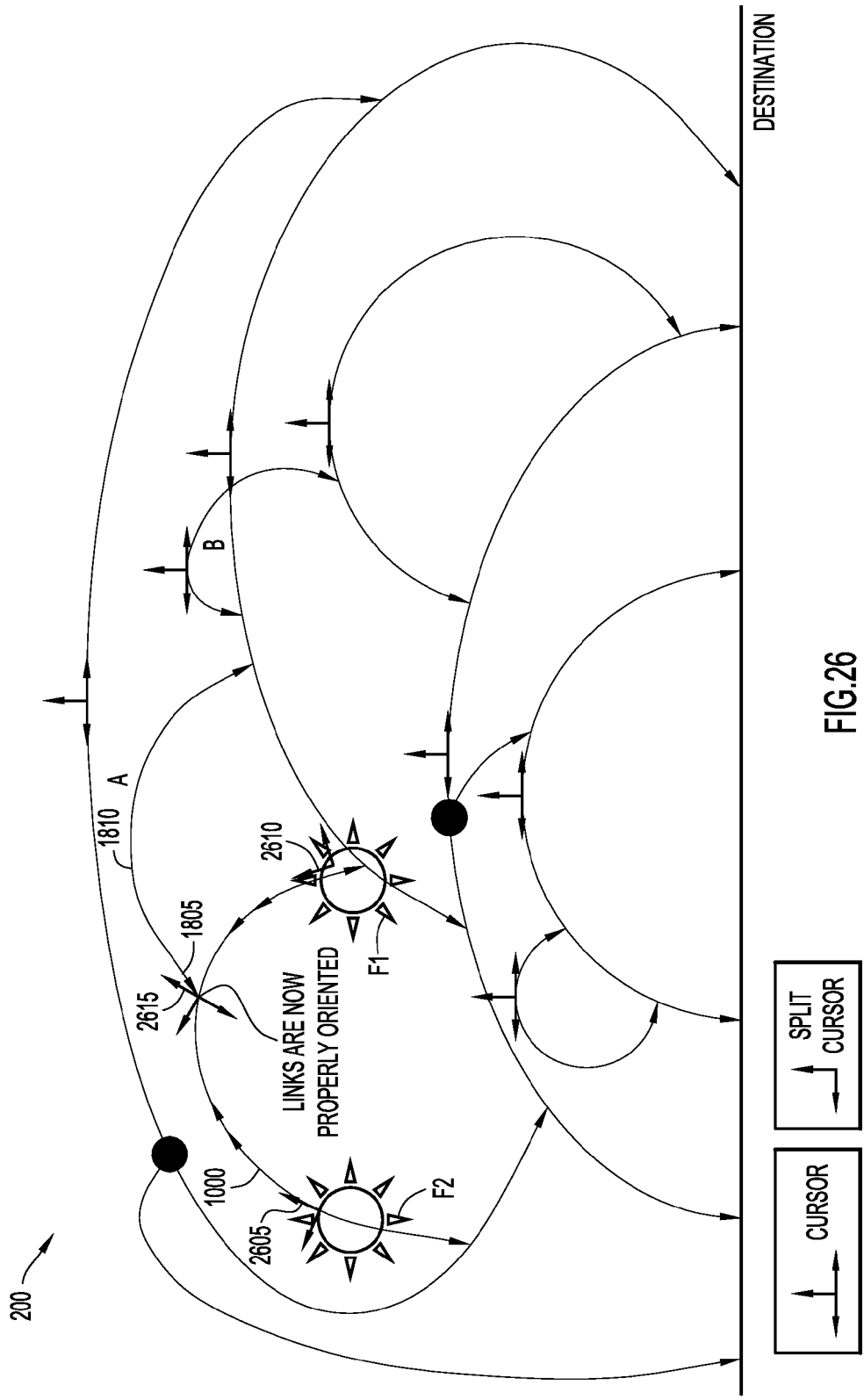

In one embodiment, unfreeze operation 1630 triggers additional JOAN frames that cause the first and second nodes proximate the first and second failures in the arc to gain possession of split or half-cursors to also achieve the redirection of network traffic away from the failures toward the parent arc incoming edge. In the example of FIG. 25, the triggered additional JOAN frames are shown at left and right arrows 2505 and 2510. Summarizing FIG. 25, unfrozen edge 1805 triggers JOAN frames 2505, 2510 to allow both broken edges proximate failures F1 and F2 in the arc 1000 to gain possession of split cursors, which orient all links in arc 1000 inwardly. The triggered JOAN frames 2505, 2510 also unfreeze all incoming edges. In the example of FIG. 26, left and right split cursors 2605 and 2610 are depicted coincident with failures F2 and F1. Also, the parent arc cursor 2615 is depicted as coincident with incoming edge 1805—which forms the exit from arc 1000 into parent arc 1810. In other words, network traffic can now exit arc 1000 toward reversed exit edge 1805.

Returning to 1630 in FIG. 16, if the attempt to transfer the cursor in the parent arc is unsuccessful, methods 710 and 1600 are recursively performed among the multiple arcs in arc topology 200, until an arc is found that can be used as an exit arc for network traffic that was blocked in the broken arc and any broken parent arcs leading away from the broken arc.

The exchange of second JOAN frames in the data plane in method 1600 and the recursive exchange of first and second JOAN frames in parent arcs also in the data plane result in repair/rerouting in the arcs of the network without any interaction with a network controller of the network, i.e., no OEM management frames are exchanged with the network controller.

Concurrent Single Failures in Multiple Arcs

FIGS. 27-34 depict successive stages of handling a third example arc failure scenario in which multiple arcs in arc topology 200 each incur a single failure concurrently as a result of an SLRG failure. Each single failure is handled according to methods 700 and 1600 described above and recursions of these methods.

Figure 27:
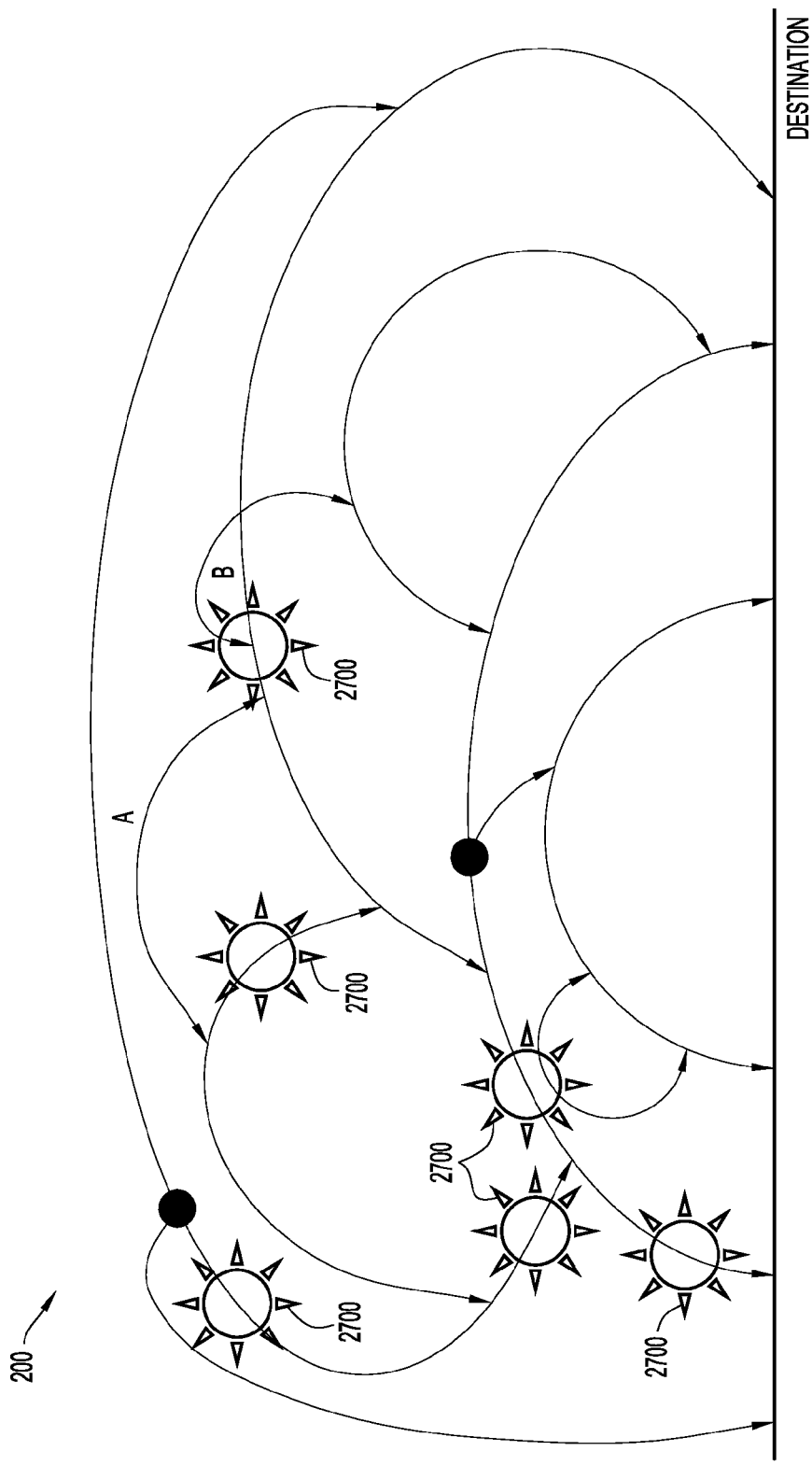
FIGS. 27-34 collectively depict a third example arc failure scenario in which multiple arcs in the arc topology of FIG. 2 each incurs a single failure more or less simultaneously.

FIG. 27 depicts the multiple concurrent single failures 2700 in arc topology 200.

Figure 28:
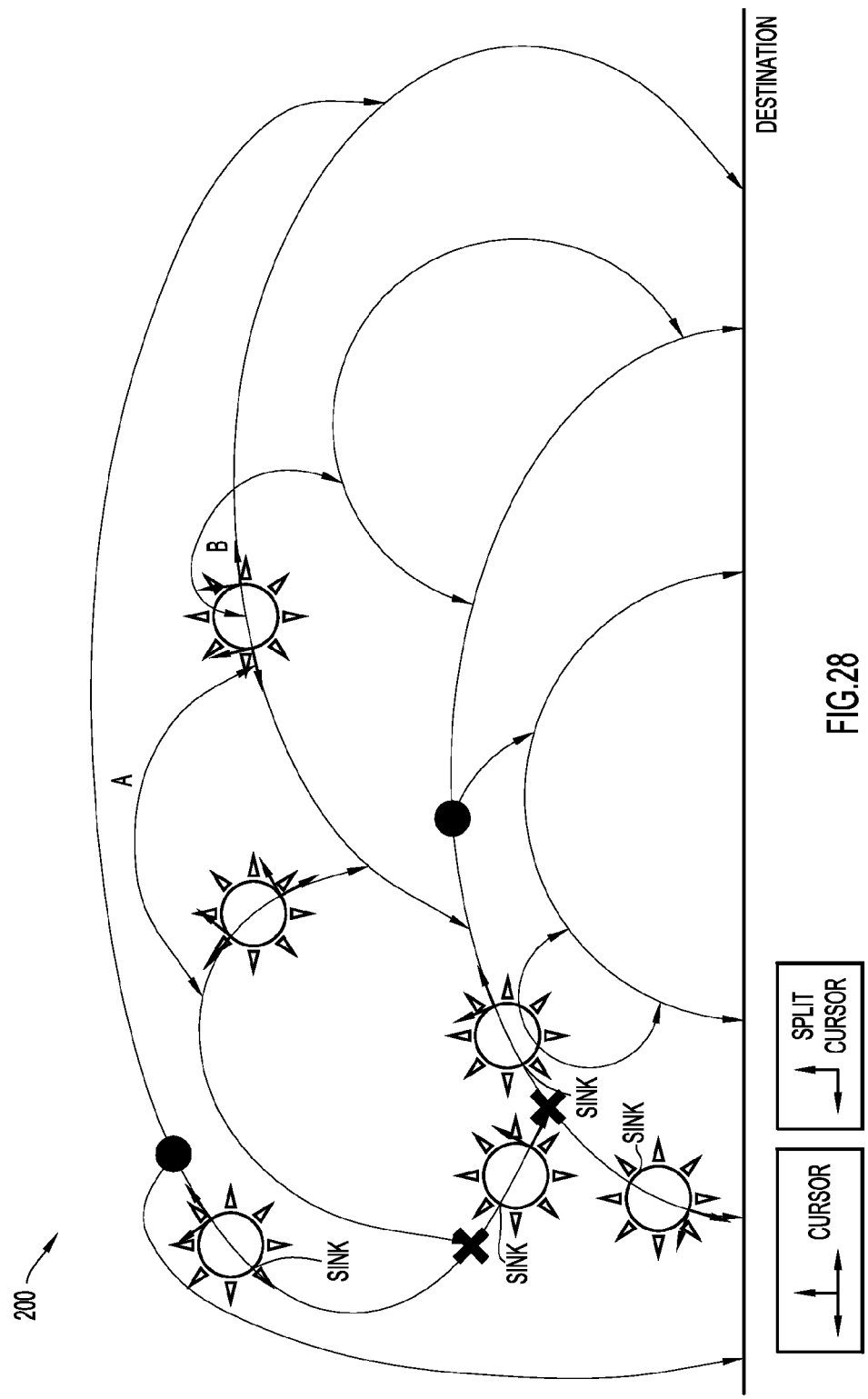

FIG. 28 depicts arc topology 200 after first JOAN frames have been exchanged in the broken arcs. The exchanges of first JOAN frames places sinks at the failure locations, transfers cursors to the failure locations if possible (the cursors are depicted as L-shaped half-cursors in FIG. 28), and a freezes incoming edges to broken segments, where a broken segment may include one or more arcs.

Figure 29:
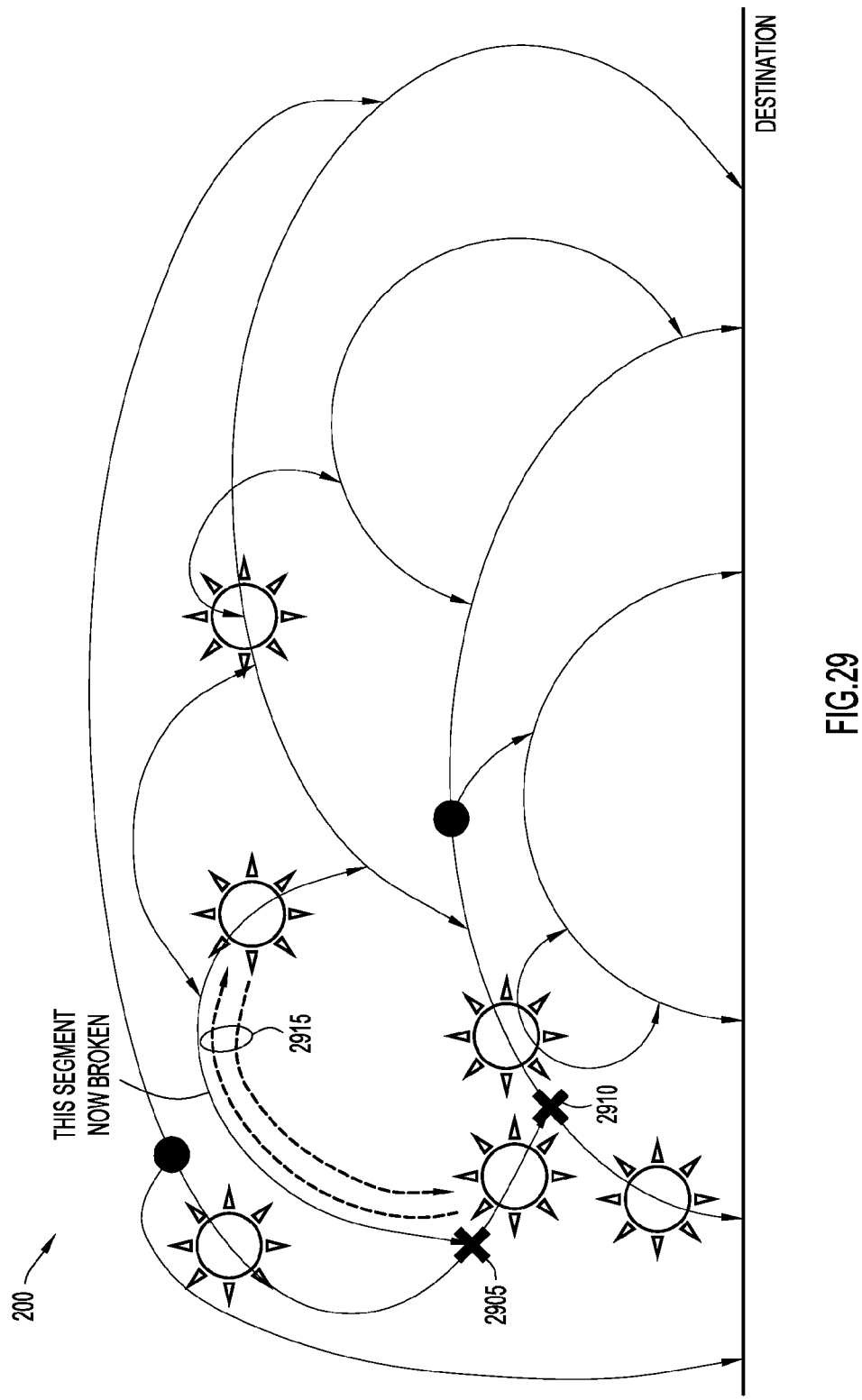

FIG. 29 depicts frozen edges 2905, 2910, which cause additional broken segments and an exchange of additional JOAN Frames 2915.

The multiple failure locations become sinks that are unable to pass network traffic and emit JOAN frames, as described above.

Figure 30:
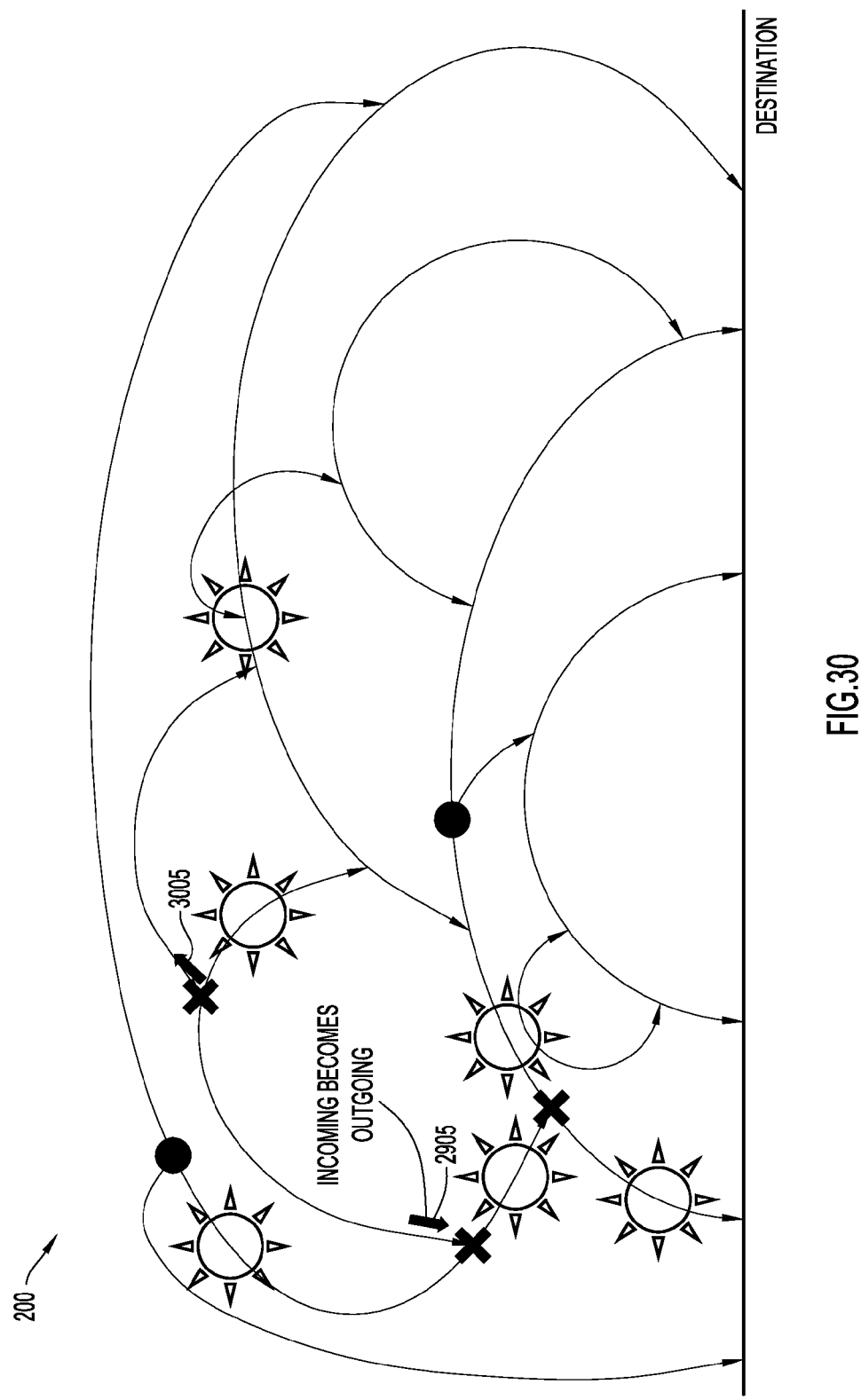

FIG. 30 depicts returned incoming edges 2905, 3005 resulting from exchanges of Reverse-Incoming JOAN frames.

Figure 31:
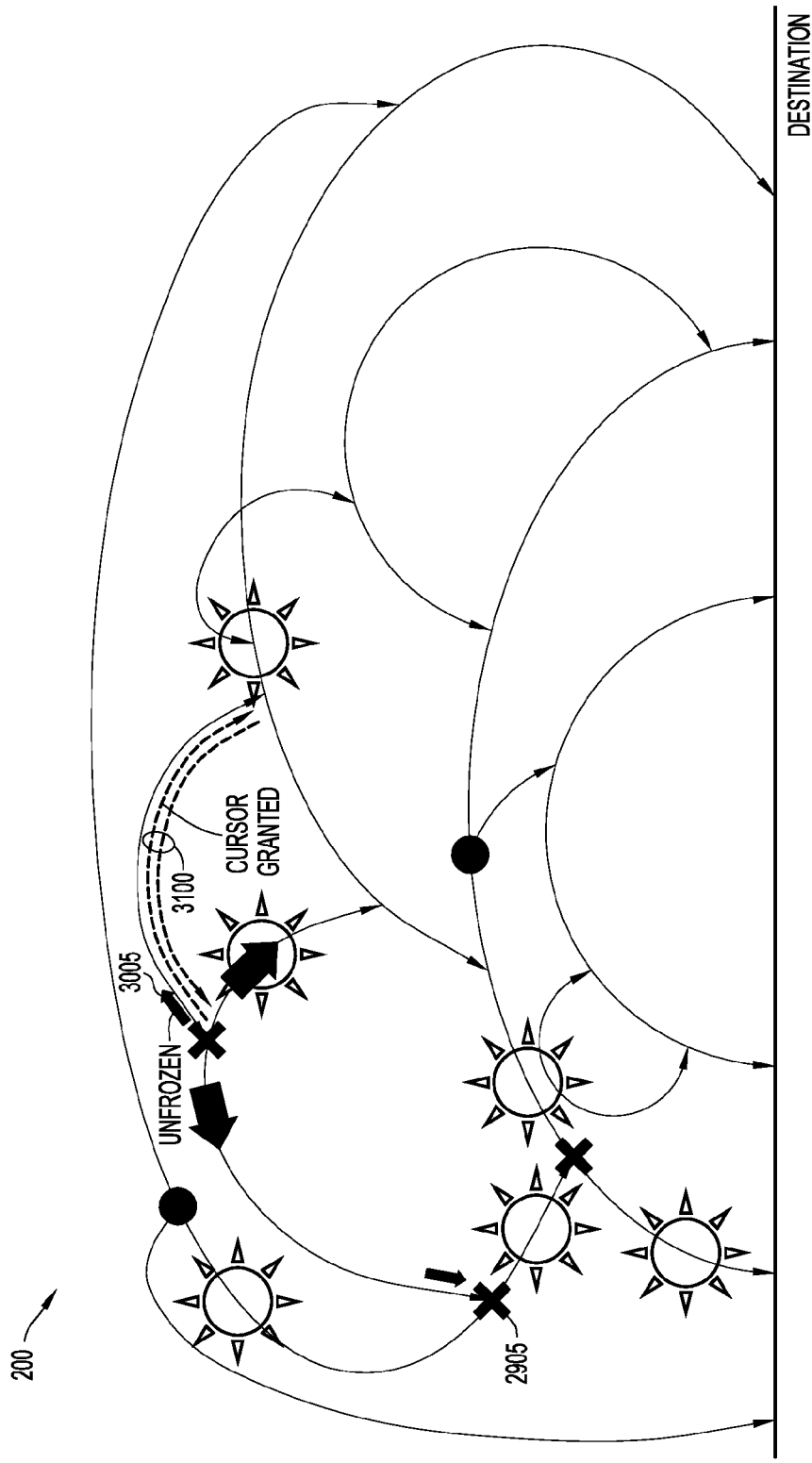

FIG. 31 depicts a result of the recursive exchange of JOAN frames (e.g., at 3100) across the multiple failed arcs until a point where a cursor transfer is successfully gained (i.e., granted) in a parent arc and its incoming (but reversed) edge is unfrozen, e.g., at edge 3005.

Figure 32:
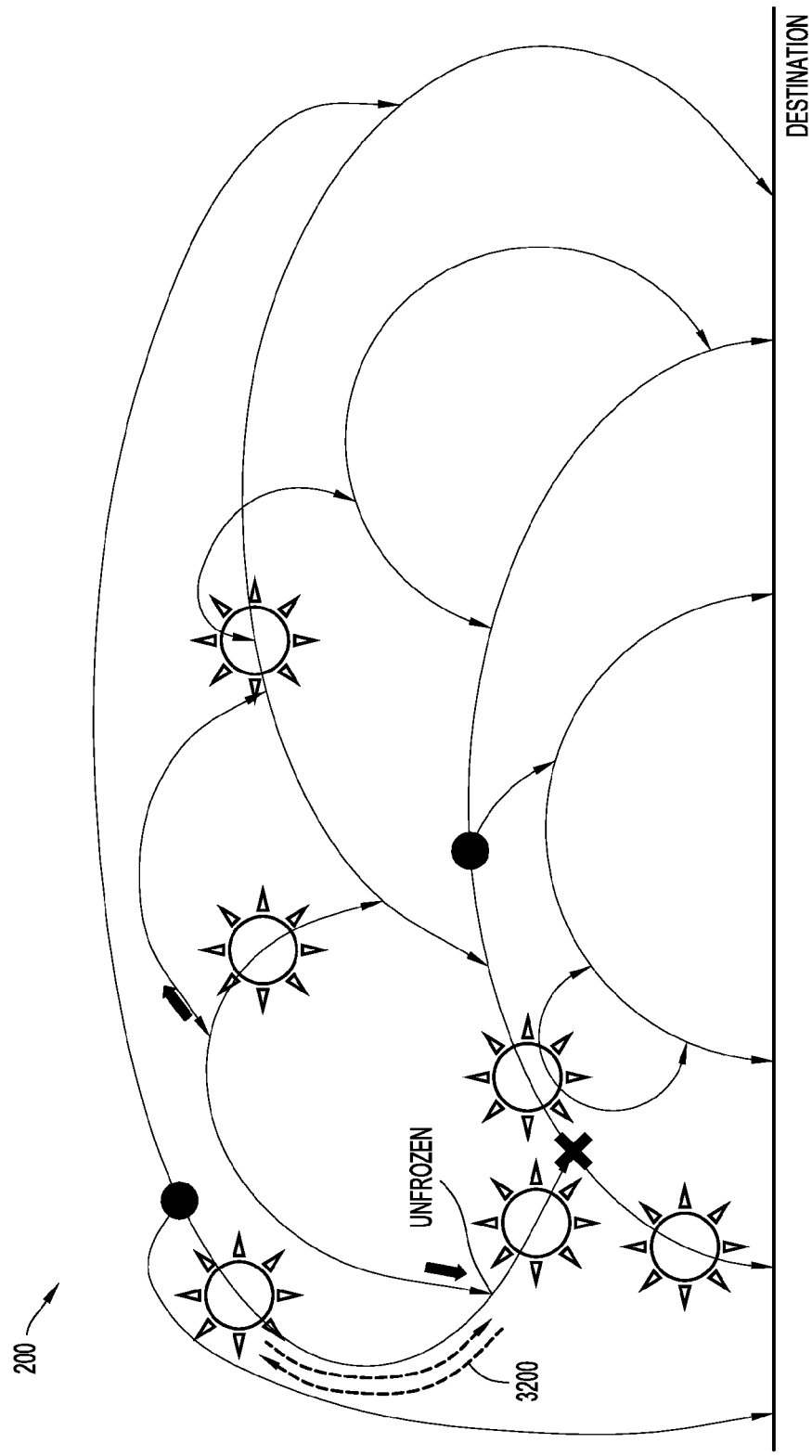

FIG. 32 depicts another exchange of JOAN frames at 3200 to turn all incoming edges to outgoing edges in an isolated segment of arc topology 200 resulting from unfreezing an edge in the isolated segment.

Figure 33:
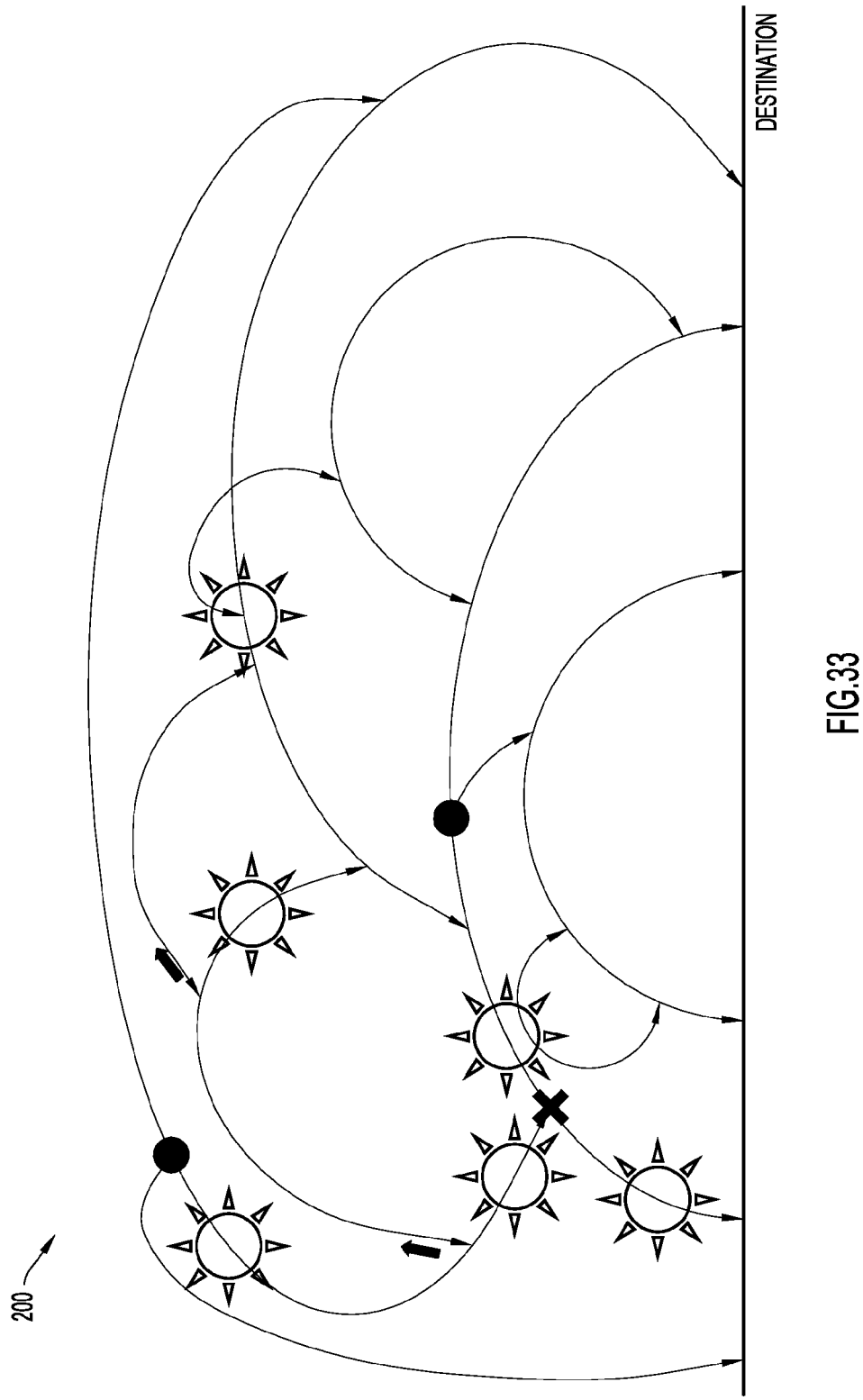

FIG. 33 depicts arc topology 200 reconfigured/repaired as a result of the exchange of JOAN Frames responsive to the multiple failures.

Figure 34:
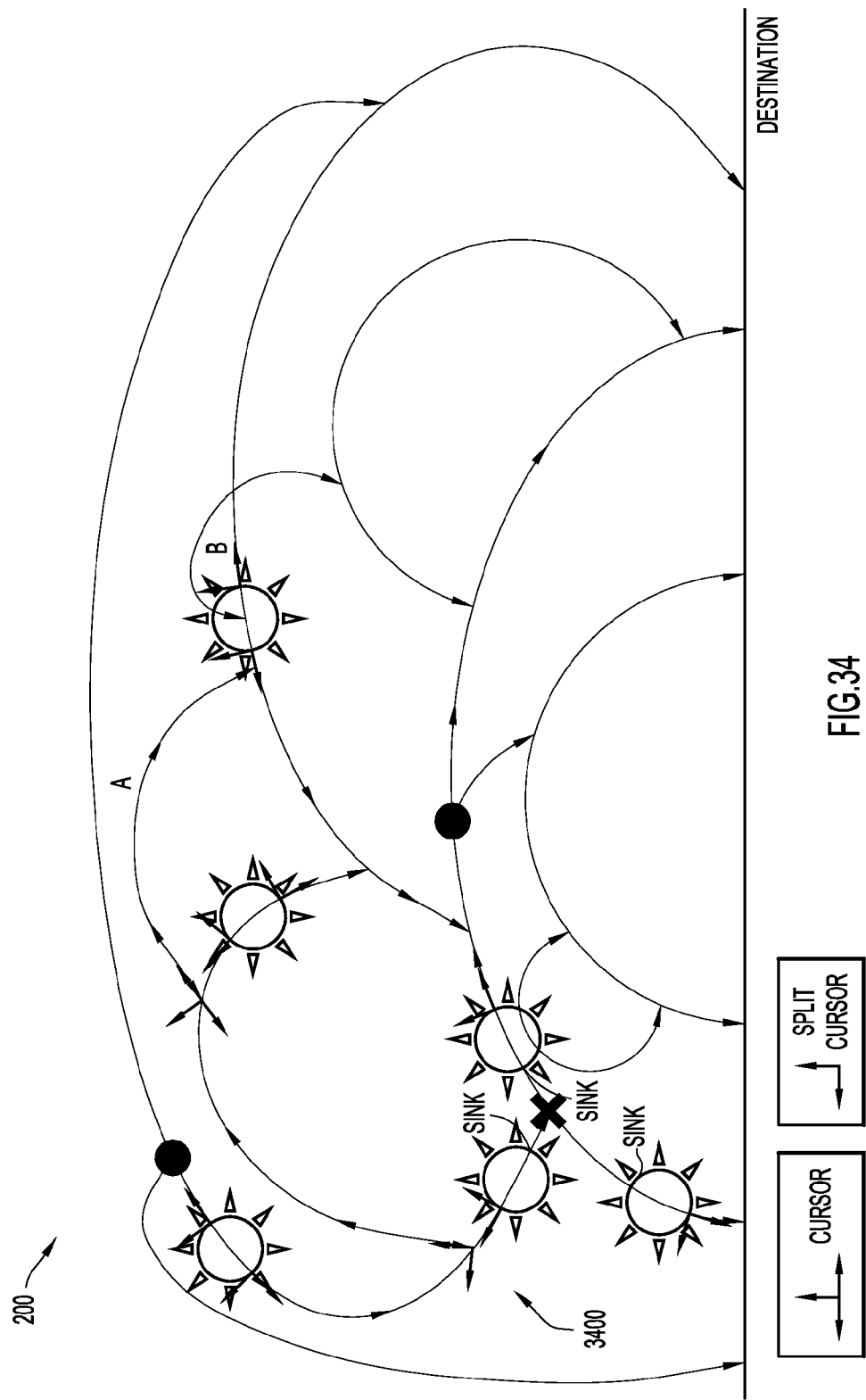

FIG. 34 depicts arc topology 200 with split-cursors to direct network traffic. The left-hand side 3400 corresponds to an isolated segment of arc topology 200. An isolated segment is one in which there is no exit for network traffic leading to the destination.

As can be seen from the discussion above in connection with FIGS. 27-34, freezing an outgoing edge in a parent arc (which is incoming relative to the child arc to that parent) that already has a breakage therein may cause a new isolated segment in the parent ARC, in which case the JOAN frames in the parent ARC fails to obtain the cursor. The process recurses in the parent ARC, freezing and then returning all the incoming links (i.e., edges), including the link that was just returned from the child arc. This may in turn cause the child arc to return that particular edge, and in some situations this may lead to a loop. To prevent this from happening until an exit is found, the time period between times when a link is reversed and then reversed again can grow exponentially as can the number of times this may occur. Therefore, the aforementioned time period and/or the number of times is capped at or limited to a maximum value (i.e., a maximum time period and/or a maximum number of times). In other words, when a link is frozen and reversed, it may be reversed again after a period of time, and may be reversed many more times. That period of time and the number of times should be limited to maximum corresponding values. An example maximum time period is in the range of 10-30 seconds, although the maximum time period may be more or less than 10-30 seconds. Also, a maximum number of times that reversal and freezing may be repeated is in the range of 5-10 time, although more or less times may be used.

In other words, the techniques provided herein may include limiting to a maximum time a time between successive instances of a given incoming edge of a given parent arc being frozen and reversed as are result of the recursively performing the methods 700 and 1600 in parent arcs. Similarly, techniques provided herein may also include limiting to a maximum number of times that a given incoming edge of a given arc is permitted to be repeatedly frozen and reversed as are result of the recursively performing the methods 700 and 1600.

In summary, in one form, a method is provided, comprising: in a routing arc of a network including routing arcs for routing of network traffic to a destination, each routing arc comprising nodes connected in sequence by reversible links oriented to direct network traffic in the routing arc to first and second edge nodes and their corresponding edges at opposite ends of the routing arc and through which the network traffic exits the routing arc, wherein the routing arc includes incoming nodes each connected with a corresponding incoming edge of a corresponding parent routing arc that directs network traffic in that parent routing arc toward the corresponding incoming node, each node including a network device: detecting a first failure in the routing arc proximate a first node in the routing arc; responsive to the detecting the first failure, exchanging first management frames between nodes within the routing arc in order to reverse links in the routing arc as appropriate so that the network traffic in the routing arc is directed away from the first failure toward the first edge node of the routing arc through which the network traffic is able to exit the routing arc; detecting a second failure in the routing arc proximate a second node in the routing arc that is spaced apart from the first failure proximate the first node; and responsive to the detecting the second failure, exchanging second management frames between nodes in the routing arc to freeze each incoming edge to prevent network traffic in the corresponding parent routing arc from entering the routing arc.

In another form, a system is provided, comprising: nodes in a routing arc of a network including routing arcs for loop-free routing of network traffic to a destination network, the nodes connected in sequence by reversible links oriented to direct network traffic in the routing arc to first and second edge nodes and their corresponding edges at opposite ends of the routing arc and through which the network traffic exits the routing arc, wherein the routing arc includes incoming nodes each connected with a corresponding incoming edge of a corresponding parent routing arc that directs network traffic in that parent routing arc toward the corresponding incoming node, and wherein each node includes: an interface unit configured to implement corresponding reversible links; and a processor coupled to the network interface unit; and wherein the nodes are configured to: detect a first failure in the routing arc proximate a first node in the routing arc; responsive to the detecting the first failure, exchange first management frames between nodes in the routing arc in order to reverse links in the routing arc as appropriate so that the network traffic in the routing arc is directed away from the first failure toward the first edge node of the routing arc through which the network traffic is able to exit the routing arc; detect a second failure in the routing arc proximate a second node in the routing arc that is spaced apart from the first failure proximate the first node; and responsive to the detecting the second failure, exchange second management frames between nodes in the routing arc to freeze each incoming edge to prevent network traffic in the corresponding parent routing arc from entering the routing arc.

In still another form, one or more non-transitory computer readable storage media are encoded with instructions that, when executed by respective processors of nodes in a routing arc of a network including routing arcs for loop-free routing of network traffic to a destination network, the nodes connected in sequence by reversible links oriented to direct network traffic in the routing arc to first and second edge nodes and their corresponding edges at opposite ends of the routing arc and through which the network traffic exits the routing arc, wherein the routing arc includes incoming nodes each connected with a corresponding incoming edge of a corresponding parent routing arc that directs network traffic in that parent routing arc toward the corresponding incoming node, cause the nodes to: detect a first failure in the routing arc proximate a first node in the routing arc; responsive to the detecting the first failure, exchange first management frames between nodes in the routing arc in order to reverse links in the routing arc as appropriate so that the network traffic in the routing arc is directed away from the first failure toward the first edge node of the routing arc through which the network traffic is able to exit the routing arc; detect a second failure in the routing arc proximate a second node in the routing arc that is spaced apart from the first failure proximate the first node; and responsive to the detecting the second failure, exchange second management frames between nodes in the routing arc to freeze each incoming edge to prevent network traffic in the corresponding parent routing arc from entering the routing arc.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. In a network including routing arcs for routing of network traffic to a destination, each routing arc comprising nodes connected in sequence by reversible links oriented to direct network traffic in the routing arc to first and second edge nodes and their corresponding edges at opposite ends of the routing arc and through which the network traffic exits the routing arc, wherein the routing arc includes incoming nodes each connected with a corresponding incoming edge of a corresponding parent routing arc that directs network traffic in that parent routing arc toward the corresponding incoming node, each node including a network device, a method comprising:
   detecting a first failure in a routing arc proximate a first node in the routing arc;
   responsive to the detecting the first failure, exchanging first management frames over a data plane in the network between nodes within the routing arc in order to reverse links in the routing arc as appropriate so that the network traffic in the routing arc is directed away from the first failure toward the first edge node of the routing arc through which the network traffic is able to exit the routing arc;
   detecting a second failure in the routing arc proximate a second node in the routing arc that is spaced apart from the first failure proximate the first node; and
   responsive to the detecting the second failure, exchanging second management frames between nodes in the routing arc to:
      freeze each incoming node to prevent network traffic in the corresponding parent routing arc from entering the routing arc;
      reverse each incoming edge so that network traffic originating in the routing arc and transiting the corresponding incoming node will be directed toward the corresponding parent routing arc; and
      reverse links in the routing arc so that all network traffic originating in the routing arc is directed to incoming edges.

2. The method of claim 1, wherein the exchanging the second management frames further includes:
   sending a Cursor-Request management frame from the second node toward the second edge node;

responsive to the Cursor-Request management frame, sending from the first node toward the second node a Cursor-Reject management frame indicating a cursor, which causes all network traffic in the routing arc to flow away from the cursor, cannot be transferred and to freeze each incoming edge in the corresponding incoming node transited by the Cursor-Reject management frame; and responsive to the Cursor-Reject management frame, sending a Reverse-Incoming management frame from the second node toward the first node to:

reverse each incoming edge in the corresponding incoming node transited by the reverse-incoming management frame; and reverse links for each node in the routing arc transited by the Reverse-Incoming management frame from the second node up to a first of the incoming nodes transited by the Reverse-Incoming management frame.

3. The method of claim 1, further comprising in each parent routing arc:

designating the frozen reversed incoming edge as a detected failure in the parent routing arc;

exchanging a second instance of first management frames in the parent routing arc to attempt to transfer the cursor to an edge of the parent routing arc corresponding to the frozen reversed incoming edge;

if the attempt is successful, unfreezing the frozen reversed incoming edge; and otherwise, recursively performing the exchanging first management frames and the exchanging second management frames among multiple routing arcs until a routing arc is found that can be used as an exit routing arc for network traffic that was blocked in the routing arc and any parent routing arcs in which failures were detected and that lead away from broken routing arcs.

4. The method of claim 3, further comprising:

limiting to a maximum time period a time between successive instances of a given incoming edge of a given parent routing arc being frozen and reversed as a result of the recursively performing.

5. The method of claim 3, further comprising:

limiting to a maximum number of times that a given incoming edge of a given routing arc is permitted to be repeatedly frozen and reversed as a result of the recursively performing.

6. The method of claim 1, wherein the exchanging first management frames includes:

sending a Cursor-Request management frame from the first node toward the first edge node in a direction that causes that management frame to transit the node initially holding a cursor;

responsive to the Cursor-Request management frame, sending a Cursor-Grant management frame from the first edge node back to the first node; and responsive to the Cursor-Grant management frame transiting the node initially holding the cursor and next nodes thereafter including the first node:

transferring the cursor from the node initially holding the cursor to the first node; and reversing links for each of the next nodes so that network traffic in the routing arc is thereafter directed away from the first node toward the first edge node.

7. The method of claim 6, wherein the transferring the cursor includes:

transferring a token representative of the cursor to the Cursor-Grant management frame as the Cursor-Grant management frame transits the node initially holding the cursor; and accepting the token as the cursor at the first node when the Cursor-Grant management frame is received at the first node; and the reversing includes reversing links at each of the next nodes as the Cursor-Grant management frame transits each of the next nodes responsive to a presence of the token in the Cursor-Grant management frame.

8. A system comprising:

nodes in a routing arc of a network including routing arcs for loop-free routing of network traffic to a destination network, the nodes connected in sequence by reversible links oriented to direct network traffic in the routing arc to first and second edge nodes and their corresponding edges at opposite ends of the routing arc and through which the network traffic exits the routing arc, wherein the routing arc includes incoming nodes each connected with a corresponding incoming edge of a corresponding parent arc that directs network traffic in that parent routing arc toward the corresponding incoming node, and wherein each node includes:

an interface unit configured to implement corresponding reversible links; and a processor coupled to the network interface unit; and wherein the nodes are configured to:

detect a first failure in the arc proximate a first node in the routing arc;

responsive to the detecting the first failure, exchange first management frames over a data plane in the network between nodes in the routing arc in order to reverse links in the routing arc as appropriate so that the network traffic in the arc is directed away from the first failure toward the first edge node of the routing arc through which the network traffic is able to exit the routing arc;

detect a second failure in the arc proximate a second node in the routing arc that is spaced apart from the first failure proximate the first node; and responsive to the detecting the second failure, exchange second management frames between nodes in the routing arc to:

freeze each incoming edge to prevent network traffic in the corresponding parent arc from entering the routing arc;

reverse each incoming edge so that network traffic originating in the routing arc and transiting the corresponding incoming node will be directed toward the corresponding parent arc; and reverse links in the routing arc as appropriate so that all network traffic originating in the arc is directed to incoming edges.

9. The system of claim 8, wherein the nodes are configured to exchange the second management frames by:

sending a Cursor-Request management frame from the second node toward the second edge node;

responsive to the Cursor-Request management frame, sending from the first node toward the second node a Cursor-Reject management frame indicating a cursor, which causes all network traffic in the routing arc to flow away from the cursor, cannot be transferred and to freeze each incoming edge in the corresponding incoming node transited by the Cursor-Reject management frame; and responsive to the Cursor-Reject management frame, sending a Reverse-Incoming management frame from the second node toward the first node to:
  reverse each incoming edge in the corresponding incoming node transited by the reverse-incoming management frame; and
  reverse links for each node in the arc transited by the Reverse-Incoming management frame from the second node up to a first of the incoming nodes transited by the Reverse-Incoming management frame.

10. The system of claim 8, further comprising nodes in each parent routing arc, wherein the nodes in each parent routing arc are configured to:
  designate the frozen reversed incoming edge as a detected failure in the parent arc;
  exchange a second instance of first management frames in the parent routing arc to attempt to transfer the cursor to an edge of the parent routing arc corresponding to the frozen reversed incoming edge;
  if the attempt is successful, unfreeze the frozen reversed incoming edge; and
  otherwise, recursively perform the exchange of first management frames and the exchange of second management frames among multiple routing arcs until a routing arc is found that can be used as an exit routing arc for network traffic that was blocked in the routing arc and any parent routing arcs in which failures were detected and that lead away from broken routing arcs.

11. The system of claim 10, wherein a time period between successive instances of a given incoming edge of a given parent routing arc being frozen and reversed as are result of the recursively performing is limited to a maximum time.

12. The system of claim 10, wherein a number of times that a given incoming edge of a given routing arc is permitted to be repeatedly frozen and reversed is limited to a maximum number of times.

13. The system of claim 8, wherein the nodes are configured to exchange the first management frames by:
  sending a Cursor-Request management frame from the first node toward the first edge node in a direction that causes that management frame to transit the node initially holding the cursor;
  responsive to the Cursor-Request management frame, sending a Cursor-Grant management frame from the first edge node back to the first node; and
  responsive to the Cursor-Grant management frame transiting the node initially holding the cursor and next nodes thereafter including the first node:
    transferring the cursor from the node initially holding the cursor to the first node; and
    reversing links for each of the next nodes so that network traffic in the arc is thereafter directed away from the first node toward the first edge node.

14. The system of claim 13, wherein:
  the nodes are configured to perform the transferring of the cursor by:
    transferring a token representative of the cursor to the Cursor-Grant management frame as the Cursor-Grant management frame transits the node initially holding the cursor; and
    accepting the token as the cursor at the first node when the Cursor-Grant management frame is received at the first node; and
  the nodes are configured to perform the reversing by reversing links at each of the next nodes as the Cursor-Grant management frame transits each of the next nodes responsive to a presence of the token in the Cursor-Grant management frame.

15. One or more non-transitory computer readable storage media encoded with instructions that, when executed by respective processors of nodes in a routing arc of a network including routing arcs for loop-free routing of network traffic to a destination network, the nodes connected in sequence by reversible links oriented to direct network traffic in the routing arc to first and second edge nodes and their corresponding edges at opposite ends of the arc and through which the network traffic exits the routing arc, wherein the routing arc includes incoming nodes each connected with a corresponding incoming edge of a corresponding parent routing arc that directs network traffic in that parent routing arc toward the corresponding incoming node, cause the nodes to:
  detect a first failure in the arc proximate a first node in the routing arc;
  responsive to the detecting the first failure, exchange first management frames over a data plane in the network between nodes in the routing arc in order to reverse links in the routing arc as appropriate so that the network traffic in the routing arc is directed away from the first failure toward the first edge node of the routing arc through which the network traffic is able to exit the routing arc;
  detect a second failure in the routing arc proximate a second node in the routing arc that is spaced apart from the first failure proximate the first node; and
  responsive to detecting the second failure, exchange second management frames between nodes in the routing arc to:
    freeze each incoming edge to prevent network traffic in the corresponding parent routing arc from entering the routing arc;
    reverse each incoming edge so that network traffic originating in the routing arc and transiting the corresponding incoming node will be directed toward the corresponding parent routing arc; and
    reverse links in the routing arc as appropriate so that all network traffic originating in the routing arc is directed to incoming edges.

16. The one or more non-transitory computer readable storage media of claim 15, wherein the instructions to cause the nodes to exchange the second management frames include instructions to cause the nodes to:
  send a Cursor-Request management frame from the second node toward the second edge node;
  responsive to the Cursor-Request management frame, send a Cursor-Reject management frame from the first node toward the second node indicating a cursor, which causes all network traffic in the routing arc to flow away from the cursor, cannot be transferred and to freeze each incoming edge in the corresponding incoming node transited by the Cursor-Reject management frame; and
  responsive to the Cursor-Reject management frame, send a Reverse-Incoming management frame from the second node toward the first node to:
    reverse each incoming edge in the corresponding incoming node transited by the reverse-incoming management frame; and
    reverse links for each node in the arc transited by the Reverse-Incoming management frame from the second node up to a first of the incoming nodes transited by the Reverse-Incoming management frame.

17. The one or more non-transitory computer readable storage media of claim 16, wherein the instructions to cause the nodes to exchange the first management frames include instructions to cause the nodes to:
- send a Cursor-Request management frame from the first node toward the first edge node in a direction that causes that management frame to transit the node initially holding the cursor;
- responsive to the Cursor-Request management frame, send a Cursor-Grant management frame from the first edge node back to the first node; and
- responsive to the Cursor-Grant management frame transiting the node initially holding the cursor and next nodes thereafter including the first node:
  - transfer the cursor from the node initially holding the cursor to the first node; and
  - reverse links for each of the next nodes so that network traffic in the routing arc is thereafter directed away from the first node toward the first edge node.

\* \* \* \* \*